(12) United States Patent  
Sugikawa

(10) Patent No.: US 7,319,845 B2  
(45) Date of Patent: Jan. 15, 2008

(54) INFORMATION PROVIDING APPARATUS, INFORMATION RECEIVER, INFORMATION PROVIDING PROGRAM, INFORMATION RECEIVING PROGRAM AND WIRELESS COMMUNICATION APPARATUS

(75) Inventor: Akihiko Sugikawa, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 773 days.

(21) Appl. No.: 10/774,411

(22) Filed: Feb. 10, 2004

(65) Prior Publication Data

US 2004/0157559 A1    Aug. 12, 2004

(30) Foreign Application Priority Data

Feb. 10, 2003    (JP)    ............... 2003-032801

(51) Int. Cl.
*H04B 7/00*    (2006.01)
(52) U.S. Cl. ............ 455/41.2; 455/41.1; 455/450; 455/454; 370/431; 370/432; 370/463
(58) Field of Classification Search ........... 455/41.2, 455/41.1, 450, 454; 370/431, 432, 463
See application file for complete search history.

(56) References Cited

U.S. PATENT DOCUMENTS

| 6,782,241 B2 * | 8/2004 | Kobayashi ........... 455/88 |
| 6,944,457 B2 * | 9/2005 | Alinikula et al. ........ 455/450 |
| 7,076,209 B2 * | 7/2006 | Sugikawa et al. ....... 455/41.2 |
| 7,127,210 B2 * | 10/2006 | Aoyagi ............... 455/41.2 |

| 2002/0037699 A1 * | 3/2002 | Kobayashi et al. ........ 455/41 |
| 2003/0114176 A1 * | 6/2003 | Phillipps ............... 455/500 |

FOREIGN PATENT DOCUMENTS

| JP | 11-355170 | 12/1999 |
| JP | 2001-144781 | 5/2001 |
| JP | 2002-9695 | 1/2002 |

OTHER PUBLICATIONS

U.S. Appl. No. 09/932,873, filed Aug. 21, 2001, Sugikawa et al.
U.S. Appl. No. 10/377,789, filed Mar. 4, 2003, Sugikawa et al.
U.S. Appl. No. 10/776,275, filed Feb. 12, 2004, Sata et al.
U.S. Appl. No. 10/699,892, filed Nov. 4, 2003, Sugikawa.
U.S. Appl. No. 10/767,369, filed Jan. 30, 2004, Sata et al.
Toru Aihara, "Short-Distance Radio Communication Specification Bluetooth", BIT, vol. 32, issue 10, Oct. 1, 2000, pp. 8-16.

* cited by examiner

*Primary Examiner*—Sanh D. Phu
(74) *Attorney, Agent, or Firm*—Oblon, Spivak, McClelland, Maier & Neustadt, P.C.

(57)    ABSTRACT

The present invention has a cash register 1 and a Bluetooth portable terminal 2 which conduct short-range wireless communication to each other. The cash register 1 decreases transmission power during periods when a search request processing and a connection request processing for the Bluetooth portable terminal 2 are conducted, thereby being connected with only a prescribed Bluetooth portable terminal 2. At the time of providing services, electric power for transmission is increased. Therefore, it is possible to surely connect with the prescribed Bluetooth portable terminal 2. After connected with the prescribed Bluetooth portable terminal, even if the Bluetooth portable terminal 2 moves at comparatively broad range, it is possible to provide the Bluetooth portable terminal 2 with services.

6 Claims, 15 Drawing Sheets

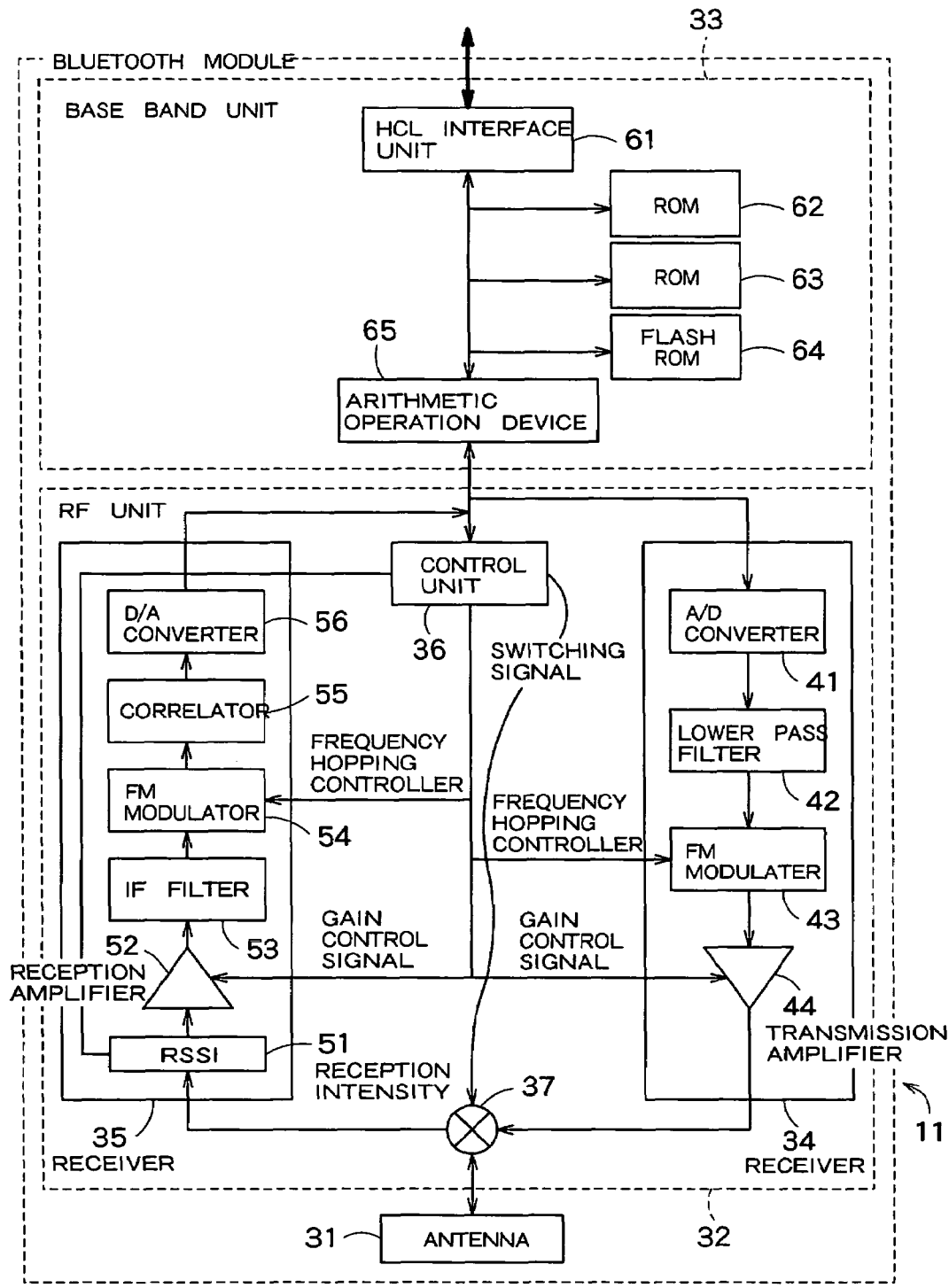
F I G . 3

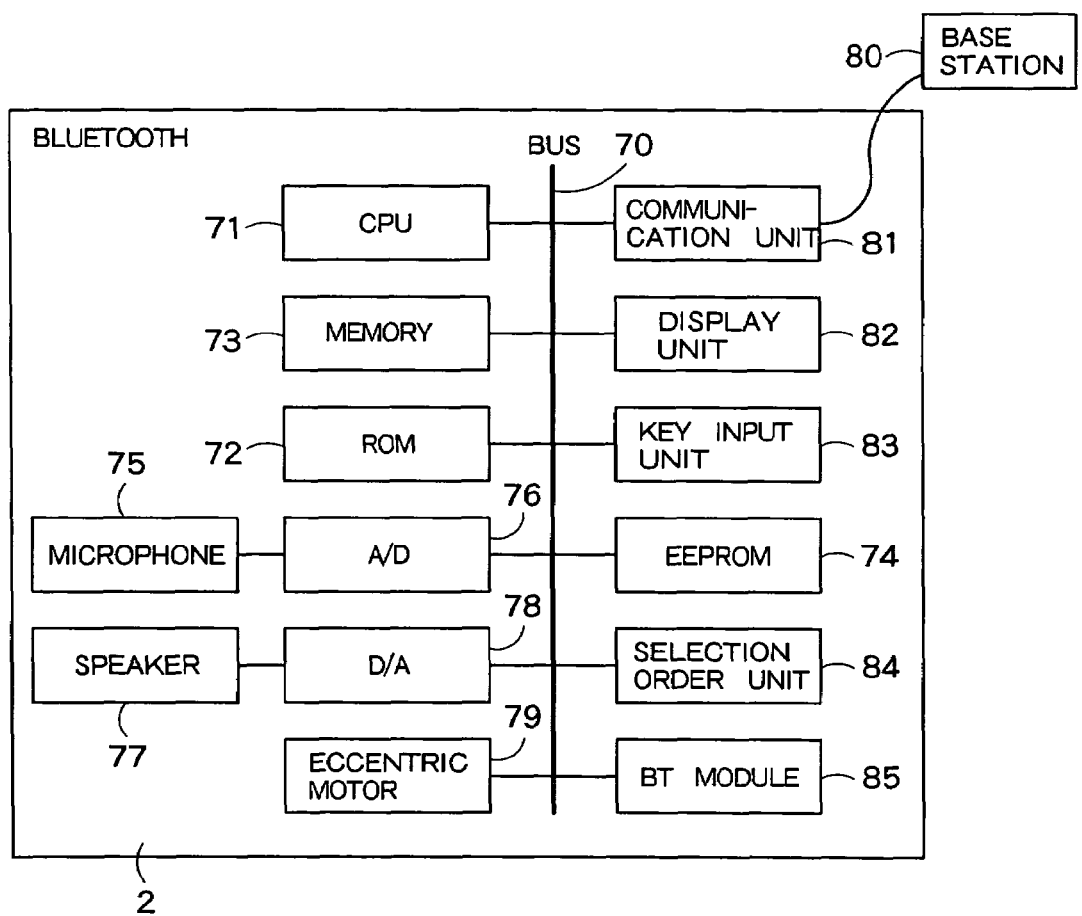
F I G . 4

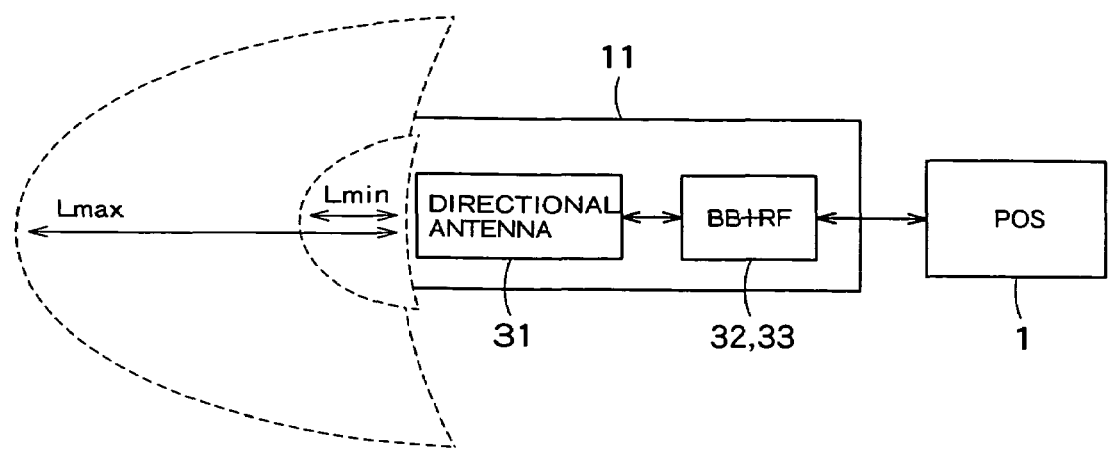
F I G . 6
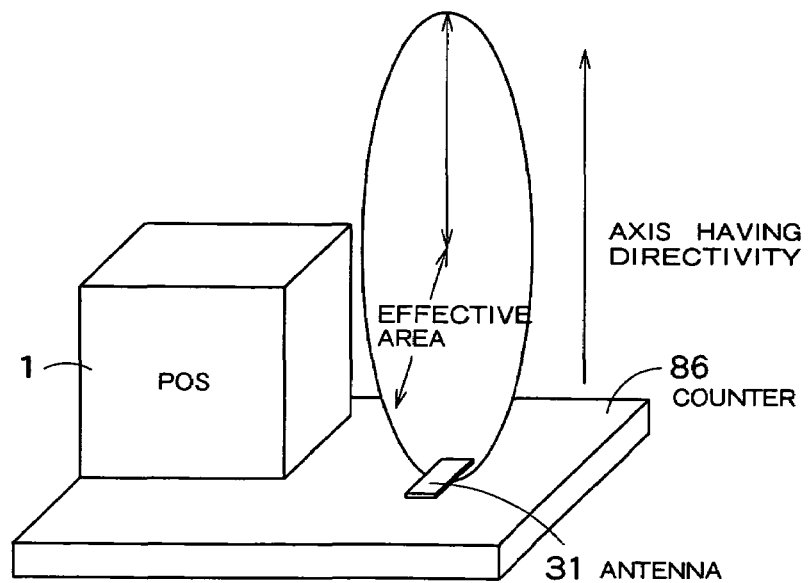
F I G . 7

INFORMATION PROVIDING APPARATUS, INFORMATION RECEIVER, INFORMATION PROVIDING PROGRAM, INFORMATION RECEIVING PROGRAM AND WIRELESS COMMUNICATION APPARATUS

CROSS REFERENCE TO RELATED APPLICATIONS

This application claims benefit of priority under 35USC§119 to Japanese Patent Application No. 2003-32801, filed on Feb. 10, 2003, the entire contents of which are incorporated by reference herein.

BACKGROUND OF THE INVENTION

1. Field of the Invention

The present invention relates to an information providing apparatus which provides various information, an information receiver which receives various information, an information providing program, an information receiving program and a wireless communication apparatus.

2. Related Art

Recently, short-range wireless communication systems having a transmission distance of approximately 10 m are attracting attention. Whereas the effective transmission distance range of the conventional wireless LAN is at least 100 m, the short-range wireless communication system is short in transmission distance and accordingly power consumption is low. Therefore, the short-range wireless communication system is suitable for information processing apparatuses limited in battery capacity, such as portable information processing apparatuses (hereafter referred to simply as portable terminal) like portable telephones or a PDAs.

One of such short-range wireless communication systems is called Bluetooth™ (see specifications available at a web site http://www.bluetooth.org/. In recent years, portable terminals having communication function according to Bluetooth specifications (hereafter simply referred to as Bluetooth communication function) and apparatuses that provide the portable terminals with various services begin to be spread.

Since the Bluetooth communication function can be implemented with an inexpensive chip and in a smaller size, apparatuses having the Bluetooth communication function are expected to be spread everywhere in the future. As the Bluetooth spreads, a plan is promoted in which it is realized to provide various services according to places in arbitrary places.

For example, in convenience stores, supermarkets, retail stores or the like, provision of service for purchasers, such as electronic coupon service, electronic point service, electronic settlement, electric receipt and voucher issuance, utilizing the Bluetooth is under study. Furthermore, application of the Bluetooth using electronic tickets to gate opening/closing control, settlement and discount service in automatic vending machines, and charge paying in parking lots, filling stations and drive-throughs is also being studied. Besides, access to the Internet, information delivery depending upon specific places, provision of user's position information, and route guide or the like are also possible. As for several services relating to the above-described application, experiments have already been conducted in actual systems.

Hereafter, a conventional technique will be described by taking as an example the case where connection using the Bluetooth is established between a portable terminal having a Bluetooth communication function (hereafter referred to simply as Bluetooth portable terminal) and an information processing apparatus having a Bluetooth communication function and providing various services (hereafter referred to simply as Bluetooth apparatus) and the Bluetooth apparatus provides service for a user having the Bluetooth portable terminal.

First, a procedure for the Bluetooth portable terminal to get service from an arbitrary opposite party in an arbitrary place will now be described.

The Bluetooth portable terminal starts a client application program to get service. Subsequently, the client application in the Bluetooth portable terminal orders a Bluetooth module to execute an inquiry for a predetermined period (for example, 10 seconds) in order to find an apparatus with which communication can be conducted. The Bluetooth module used herein is a communication processing unit that conducts the Bluetooth communication function. The Bluetooth module may be formed of hardware such as a chip or may be formed of software.

If the inquiry is completed after a specified period has elapsed, the client application sends to the Bluetooth module a command for acquiring remote names which are identification names respectively of Bluetooth apparatuses found during that period, or identification names of services provided by the Bluetooth apparatuses.

Subsequently, the client application acquires remote names of all found Bluetooth apparatuses, then shows a list of the acquired remote names to the user, and urges the user to select a Bluetooth apparatus to be connected. Subsequently, the client application orders the Bluetooth module to transmit an ACL connection request command to the Bluetooth apparatus selected by the user.

According to setting, a terminal authentication procedure is conducted during the ACL connection operation in some cases. In some cases, both apparatuses are authenticated by inputting the same link key or the same PIN code in order to create a link key in both apparatuses. For using encryption communication, authentication processing is executed, and then a temporary encryption key for encryption communication is created on the basis of the link key.

After completion of the ACL connection, the client application orders a module called Bluetooth stack to transmit a service information acquisition command. The client application acquires service information from the opposite party apparatus, and thereby acquires information concerning a protocol to be used by the application.

Subsequently, the client application orders the module called Bluetooth stack to execute connection to a protocol to be used by the client application, by using information corresponding to the protocol. For example, if the client application uses OBEX FTP to get service, the client application calls a connection request function for OBEX. In this case, the stack executes connections of RFCOMM (RF+COMM) and L2CAP (Logical Link Protocol and Adaptation Layer Control) in order, and after the completion of connections of L2CAP and RFCOMM, the connection of an OBEX protocol is conducted.

After the completion of the connection of the protocol, the client application conducts server authentication by conducting challenge response or the like at an application level. In the case of OBEX, the OBEX protocol itself has an authentication function. Even if the authentication function in the OBEX protocol is used, therefore, authentication of the service providing apparatus is possible.

By the procedure heretofore described, it becomes possible for the user to get desired service by using the Bluetooth portable terminal.

If the above-described procedure is executed, however, processing time required until the user gets service is typically as long as 10 and several seconds, because the inquiry, which is processing of finding a terminal with which communication can be conducted, is performed for a fixed time even in the case where there is only one apparatus with which communication can be conducted. Furthermore, a remote name is acquired every apparatus. If there are a large number of apparatuses with which communication can be conducted, therefore, the processing time increases in proportion to the number of apparatuses with which communication can be conducted. Supposing that approximately 1 second is required to acquire a remote name and N apparatuses have been found, it takes N seconds to acquire remote names of all apparatuses.

For example, in the case where a plurality of registers are arranged at intervals of 1 m in a supermarket or the like and a shopper searches cash registers in order to make payment by using the Bluetooth portable terminal, connection cannot be conducted unless the shopper waits as long as the time corresponding to the number of cash registers. It thus takes a long time for executing the register work.

By using a COD (Class of Device), which describes information concerning the kind of the Bluetooth apparatus included in information that can be acquired by the inquiry, it is possible to narrow down apparatuses to only apparatuses that provide desired service. However, the COD identifies the kind of the device, and the COD does not identify the service itself. For example, also in the case where a category of settlement service exists in the CCD, in the above-described example all registers belong to that category, and the CCD is not helpful in shortening the user's selection time.

On the other hand, infrared ray, which is one of short-range communication means, has directivity as compared with wireless communication. By only directing the infrared ray to a specific apparatus, the user can conduct communication with that apparatus. At the present time, infrared ray is adopted in portable telephones, and a member management system using infrared ray is implemented. However, there is a problem that it is difficult to adjust the direction of an infrared ray device and communication is disconnected unless the same posture is maintained while communication is being conducted.

Contrary, wireless communication has a characteristics that once communication with a desired opposite party has been established, there is no directivity and also in the case where there are some obstacles between two apparatuses, communication is possible. However, it is difficult to establish a connection with a specific apparatus.

For example, in the case where there are one customer (one Bluetooth portable terminal) and one register (one Bluetooth apparatus), the relation between the Bluetooth portable terminal carried by a customer who makes payment and the cash register is determined uniquely and consequently there is no problem concerning the connection. In other words, if a person who operates the Bluetooth portable terminal has found a Bluetooth apparatus by using the above-described Bluetooth apparatus search function, the found apparatus can be regarded as a cash register to which payment should be made.

In the case of a store in which a plurality of cash registers are disposed in a range in which the Bluetooth portable can conduct communication, however, the other adjacent cash registers are also found. The user carrying the Bluetooth portable terminal needs to ascertain the kind and name of a cash register to which payment should be made, and select the cash register from among the found cash registers.

If extra time is needed to select the opposite party of communication, it takes time until the user gets service and the convenience for the user is worsened. Especially in the case of payment at a register in a store, the processing operations in the cash registers are hindered at the time of congestion when a large number of customers form lines. In addition, if a person who operates the Bluetooth portable terminal specifies a wrong cash register, such troubles occur that a discount from the amount due might be not conducted although a coupon is used, or points of another person might be added to those of the person operating the Bluetooth portable terminal. In the case where such troubles have occurred, cancellation work needs to be conducted in both the Bluetooth portable terminal and the cash register, and a great deal of labor is needed.

Therefore, an operator of a cash register needs to ascertain from the customer whether the connected Bluetooth portable terminal is right, by using some information accompanying the Bluetooth portable terminal. Such selection or ascertainment work is not a good interface for a customer who makes payment, and it hinders the work of the operator.

Such problems occur in the same way also in the case where data are exchanged or data is transmitted and received between information processing apparatuses. For the information processing apparatus, a remote name having its owner as an identification name is set. In the case of a portable information processing apparatus of an individual, a name provided by the individual cannot be arbitrated. Therefore, there is a possibility that there is a portable information processing apparatus having the same remote name around the user. In this case, there is not an easy method that assures the connection with a proper apparatus, and for reliable connection there is no way other than changing the remote name of the opposite party of the connection to the unique one.

BRIEF SUMMARY OF THE INVENTION

The present invention has been achieved in order to solve the above-described problems. An object of the present invention is to provide an information providing apparatus, an information receiver, an information providing program, an information receiving program and a wireless communication apparatus whereby communication with a desired opposite party can be conducted reliably in a state in which security is maintained.

An information providing apparatus, comprising:

an identification information transmitter which transmits its own identification information to an information receiver when an existence confirmation request from said information receiver is received;

a connection request waiting unit configured to wait reception of a connection request from said information receiver after transmitting the identification information;

a connection processing unit configured to conduct connection processing for said information receiver when said connection request waiting unit receives the connection request from said information receiver;

an information providing unit configured to provide said information receiver with prescribed information after the connection processing is completed; and a power controller which controls electric power for transmitting said prescribed information so that a possible range of wireless communication at the time when said information providing unit provides information is broader than the possible time until said connection processing unit completes the connection processing.

An information receiver, comprising:

an existence confirmation unit configured to conduct an existence confirmation request with respect to an information providing apparatus;

an identification information receiver which receives a response for the existence confirmation request and acquires identification information of said information providing apparatus;

a connection processing unit configured to conduct a connection request with respect to said information providing apparatus by using the received identification information, and to conduct the connection processing with respect to said information providing apparatus;

an information receiver which receives a prescribed information from said information providing apparatus after the connection processing is completed; and a power controller which controls electric power during said connection processing unit is conducting the connection request so that a possible range of wireless communication at the time when said connection processing unit completes the connection processing is narrower than the possible range at the time when said information receiver receives information.

Furthermore, an information providing apparatus, comprising:

a first power controller which sets electric power for transmission so that a possible range of wireless communication becomes a first range;

a connection processing unit configured to conduct connection processing with respect to said information receiver when the possible range of wireless communication is set to said first range, and connection request from an information receiver is received; and a second power controller which sets electric power for transmission so that the possible range of wireless communication becomes a second range broader than the first range when it is determined that the transmitted information did not reach said information receiver before the connection processing with said information receiver is completed.

Furthermore, an information providing program which controls operation of an information providing apparatus, making a computer operate, comprising:

giving a first command which instructs said wireless communication unit to change electric power for transmission so that a possible range of wireless communication in said information providing apparatus becomes a first range; and giving a second command which instructs said wireless communication unit to change electric power for transmission so that the possible range of wireless communication in said wireless communication unit becomes a second range broader than said first range, after said wireless communication unit changes the electric power for transmission according to the first command, when said wireless communication unit notifies connection completion with said information receiver.

Furthermore, an information receiving program which controls operation of an information receiving apparatus, making a computer operate, comprising:

giving a first command which instructs said wireless communication unit to change electric power for transmission so that a possible range of wireless communication of a wireless communication unit in said information receiving apparatus becomes a first range;

instructing said information providing apparatus to transmit an existence confirmation request after said wireless communication unit changes electric power for transmission by said first command;

instructing said wireless communication unit to suspend transmission of the existence confirmation request when said wireless communication unit notifies that said information providing apparatus has received the identification information of said information providing apparatus;

giving a second command which instructs said wireless communication unit to change electric power for transmission so that the possible range of wireless communication in said wireless communication unit becomes a second range broader than the first range, after said wireless communication unit has suspended search; and instructing said wireless communication unit to conduct connection processing with said information providing apparatus, after said wireless communication unit changes electric power for transmission.

Furthermore, a wireless communication apparatus which conducts wireless communication for an information providing apparatus or an information receiving apparatus, comprising:

a first power changing unit configured to change electric power for transmission so that a possible range of wireless communication becomes a first range when a first instruction is received from a control unit;

a second power changing unit configured to change electric power for transmission so that the possible range of wireless communication becomes a second range broader than the first range when a second instruction is received from said control unit;

a connection processing unit configured to conduct connection processing for said information providing apparatus or said information receiving apparatus based on instruction from said control unit after said first power changing unit changes electric power for transmission; and an information transferring unit configured to provide said information receiver with information or to receive information from said information providing apparatus based on instruction from said control unit, after the connection processing is completed and said second power changing unit changes electric power for transmission.

DRAWINGS

FIG. 3 is a block diagram showing an example of an internal configuration of the Bluetooth module 11 included in the cash register 1.

FIG. 4 is a block diagram showing an example of an internal configuration of the Bluetooth portable terminal 2.

FIG. 6 is a diagram showing the Bluetooth module 11 and a communication area.

FIG. 7 is a diagram explaining directivity of the antenna.

DETAILED DESCRIPTION OF THE INVENTION

Hereafter, an information providing apparatus, an information receiver, an information providing program, an information receiving program and a wireless communication apparatus according to the present invention will be described more specifically with reference to the drawings.

Hereafter, an example in which a service providing apparatus and a service receiver conduct short-range wireless communication according to specifications of the Bluetooth will be mainly described. However, its communication form is not necessarily limited to the Bluetooth. The service providing apparatus is, for example, a cash register or an automatic ticket examining machine. The service receiver is, for example, a portable terminal. In an embodiment described hereafter, an example in which a cash register is used as the service providing apparatus and a portable terminal is used as the service receiver will be described.

Figure 1:
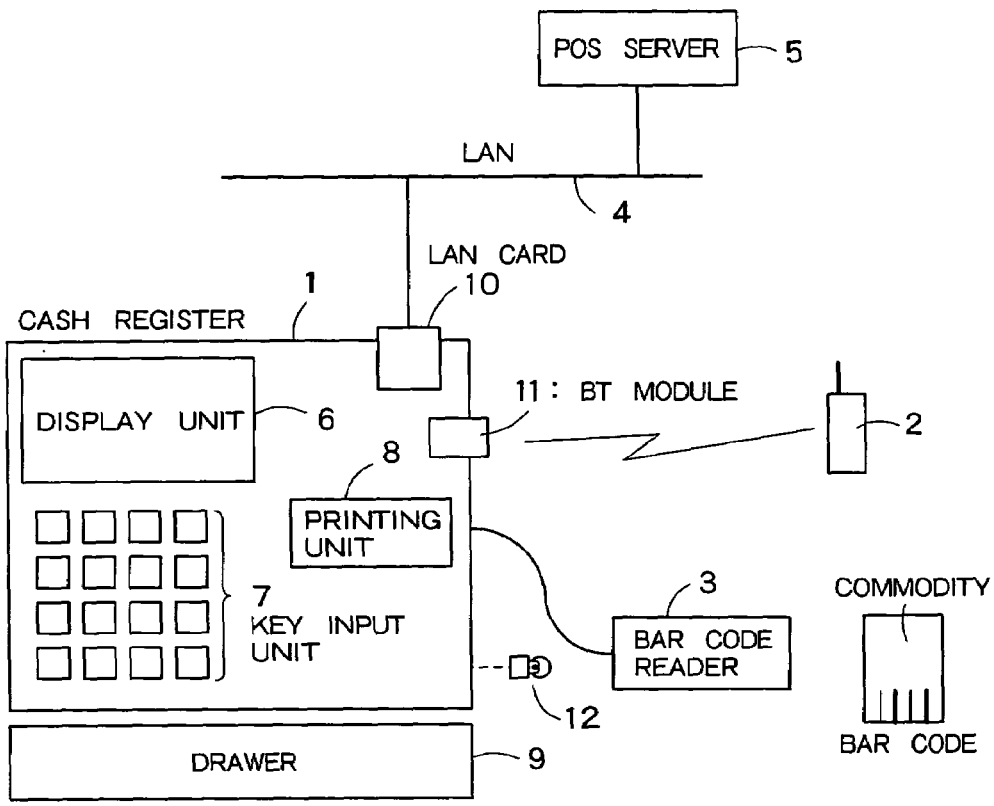
FIG. 1 is a block diagram showing a general configuration of an embodiment of a short-range wireless communication system including a service providing apparatus and a service receiver according to the present invention.

FIG. 1 is a block diagram showing a general configuration of an embodiment of a short-range wireless communication system including a service providing apparatus and a service receiver according to the present invention. The short-range wireless communication system shown in FIG. 1 includes a cash register 1 and a Bluetooth portable terminal 2, which conduct short-range wireless communication with each other according to the Bluetooth specifications, a bar code reader 3, which reads bar codes of various commodities, and a POS (Point of Sales) server 5, which conducts communication with the cash register 1 via a LAN 4.

The cash register (hereafter also referred to as POS terminal) 1 includes a display unit 6, a key input unit 7, a printing unit 8 and a drawer 9 for a charge settling function. Besides, the cash register 1 incorporates a LAN card 10 for connection to the POS server 5, and a Bluetooth module (BT module) 11 to conduct wireless communication with the Bluetooth portable terminal 2.

Figure 2:
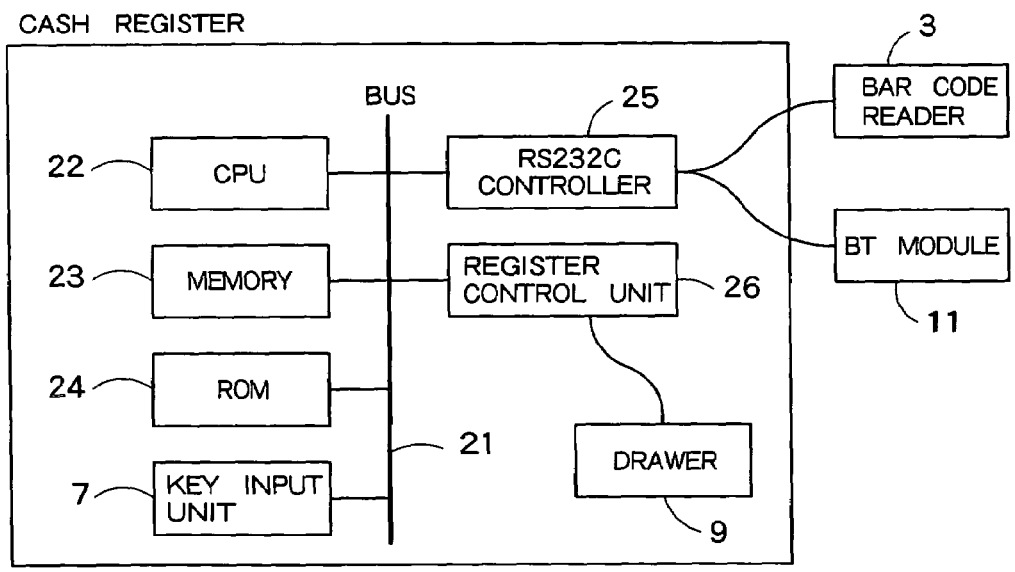
FIG. 2 is a block diagram showing an example of an internal configuration of the cash register 1.

FIG. 2 is a block diagram showing an example of an internal configuration of the cash register 1. The cash register 1 shown in FIG. 2 includes a CPU 22, a memory 23, a ROM 24, a key input unit 7, an RSC232C controller 25, a register control unit 26 and a printing unit 8, which are connected to an internal bus 21. The bar code reader 3 and the Bluetooth module 11 are connected to the RSC232C controller 25. The drawer 9 is connected to the register control unit 26.

The cash register 1 shown in FIG. 1 inquires of the POS server 5, which is connected to the cash register 1 via the LAN card 10 and the LAN 4, about an amount of money of a commodity by using a company code and a commodity code read from a bar code printed on or stuck to the commodity. Upon receiving the amount of money information from the POS server 5, the cash register 1 multiplies the amount of money by the number of articles input by the POS operator, adds a result to a total amount of money, exhibits the amount of money of the commodity and the total amount of money to the display unit 6, prints them on a receipt by using the printing unit 8, and issues a receipt. Furthermore, the cash register 1 sends sale history information of the commodities to the POS server 5. The POS server 5 conducts commodity sale management and inventory control on the basis of the sale history information sent from the cash register 1.

By the way, the cash register 1 may not inquire of the POS server 5 whenever a customer purchases a commodity, but may store amount of money information of commodities, which is periodically sent from the POS server 5, in the memory 23, and refer to contents stored in the memory 23.

FIG. 3 is a block diagram showing an example of an internal configuration of the Bluetooth module 11 included in the cash register 1. The Bluetooth module 11 shown in FIG. 3 includes an antenna 31 to transmit and receive wireless signals of 2.4 GHz, an RF unit 32 and a baseband unit 33. The RF unit 32 includes a transmitter 34, a receiver 35, a control unit 36 and a transmitter-receiver switch unit 37.

The transmitter 34 hops a transmission frequency and controls transmission power in response to an order sent from the baseband unit 33. The transmitter 34 includes an A/D converter 41, a low pass filter 42, an FM modulator 43 and a transmitter amplifier 44.

The receiver 35 hops a reception frequency, generates a reference signal, finds correlation of a received signal, and conducts FSK demodulation to receive a radio wave directed to its own apparatus. The receiver 35 includes an RSSI unit 51, a reception amplifier 52, an IF filter 53, an FM demodulator 54, a correlator 55 and a D/A converter 56.

The baseband unit 33 includes an HCI (Host Controller Interface) 61, a ROM 62, a RAM 63, a flash ROM 64 and an arithmetic operation device 65.

In response to an order from the baseband unit 33, the control unit 36 controls the transmitter-receiver switch unit 37, measures a reception intensity of the receiver 35, notifies the baseband unit 33 of the measured reception intensity, controls a gain of the transmitter amplifier 44, changes transmission power, controls a gain of the reception amplifier 52, and changes the reception intensity.

As for details of the internal configurations of the RF unit 32 and the baseband unit 33, see, for example, a book of ISBN-89797-405-5 (Bluetooth technique explanation guide).

The baseband unit 33 conducts baseband processing, link management, HCI interface processing and so on. A part of the baseband unit 33 may be formed of hardware. In the present embodiment, however, the arithmetic operation device 65, such as a CPU or a DSP, incorporated in the baseband unit 33 executes a processing program stored in the ROM 62 to conduct the above-described baseband processing.

Here, the baseband processing is processing such as packet assembly and disassembly, data error detection and correction, data encryption and decryption, and timing detection. The link management includes connection and disconnection of an ACL link and an SCO link, exchange of information concerning device information, and execution of an authentication protocol. The HCI interface processing is processing of conducting communication with a host (the cash register 1), receiving and interpreting a command sent from the host, and giving notice of a result obtained by executing the command, as an event. Buffering of data to be transmitted and received data is also included in the HCI interface processing.

If a message LMP_incr_power_req is received from another apparatus during connection of an ACL link with the apparatus, a control signal is sent in the link management to the RF unit 32 to increase the power by a predetermined amount. Conversely, if a message LMP_decr_power_req is received, power is decreased by a predetermined amount. As an optional function, the Bluetooth module 11 thus has a function of conducting automatic adjustment so as to be capable of communicating with an opposite party with which an ACL link has been established in response to an order given by the opposite party of communication, by using suitable power.

At the present time, a two-chip configuration including the RF unit 32 and the baseband unit 33 is in the mainstream. Recently, however, a single-chip device including the RF unit 32, the baseband unit 33, the link management function and the HCI interface function configured by one chip has also been developed. In the case of such a configuration, a program that controls the cash register 1 transmits an HCI (Host Controller Interface) command, which is defined in part H in core specifications, to the Bluetooth module 11, and receives its result as an HCI event. Bluetooth protocols such as the L2CAP and RFCOMM are loaded in the memory 23 together with an application program that conducts charge settling processing and an application program that provides customers with service, and executed by the CPU 22. Besides, an OS, drivers and applications are previously stored in the memory 23.

By the way, it is also possible to store a program that conducts processing for upper layer protocols such as L2CAP and RFCOMM, in the ROM 62 in the Bluetooth module 11, and execute this program in the arithmetic operation device 65 in the baseband unit 33. In this case, according to a function supported by the Bluetooth module 11, commands and events depending upon the mounting of the Bluetooth module 11 are transmitted and received to implement the control of the Bluetooth module 11 and transmission and reception of data.

If RS232C is used as the interface of the Bluetooth module 11, existing cash registers can also be coped with easily. However, it is not always necessary to connect the Bluetooth module 11 to the internal bus via the RS232C. For example, the Bluetooth module 11 may be connected directly to the internal bus 21 in the cash register 1, may be connected to the internal bus 21 via a USB (Universal Serial Bus), or may be connected to the internal bus 21 via a PCMCIA card interface.

In the case where the Bluetooth module 11 is connected directly to the internal bus 21 in the cash register 1, it is also possible to connect the RF unit 32 in the Bluetooth module 11 to the internal bus 21 and implement the baseband processing and the link management as a program in the cash register 1. In this case, the program that provides service is executed by calling a dedicated API, instead of exchange of a command called HCI interface.

FIG. 4 is a block diagram showing an example of an internal configuration of the Bluetooth portable terminal 2. The Bluetooth portable terminal 2 shown in FIG. 4 includes a CPU 71 connected to an internal bus 70 to execute a predetermined program, a ROM 72 to store programs and dictionary data, a memory 73 to store temporary variables and data, an EEPROM 74 to preserve individual registration information and electronic coupon, an A/D converter 76 to convert an audio signal picked up by a microphone 75 to a digital signal, a D/A converter 78 to convert a digital signal to an audio signal and output the audio signal to a speaker 77, an eccentric motor 79 to vibrate a chassis, a communication unit 81 to conduct communication with a base station 80, a display unit 82 to display various kinds of information, a key input unit 83 for the customer to input characters, a selection order unit 84 to select a menu, and a Bluetooth module (BT module) 85.

The Bluetooth module 85 establishes a wireless communication path between it and, for example, the cash register 1, and conducts data transmission and reception in order to get service provided by a server. The Bluetooth module 85 may have a configuration similar to that of the Bluetooth module 11 in the cash register 1, or may have a different configuration. For example, in the case of the configuration similar to that shown in FIG. 3, the RF unit 32 may be connected to the internal bus in the baseband unit 33.

A configuration concerning audio talk is similar to that in the conventional portable telephone. For example, the communication unit 81 conducts position registration and call control at the time of call originating and call incoming, and conducts data transmission and reception between the base station 80 and the communication unit 81. When the communication has finished, the communication unit 81 conducts call control for disconnection. Further, while communication is being conducted, the communication unit 81 conducts handover and so on.

If the connection unit 81 has received a connection request from the base station 80, the connection unit 81 outputs a ringing tone through the speaker 77. Or the connection unit 81 drives the eccentric motor 79 to vibrate the chassis of the Bluetooth portable terminal 2 and thereby arouse the attention of the user who is the owner of the Bluetooth portable terminal 2. After the user has ordered connection approval, the carrier connects a line between two points and starts communication.

At the time of communication, the Bluetooth portable terminal 2 converts an analog signal representing a voice input through the microphone 75 to a digital signal by using the A/D converter 76, and conducts compression processing on the digital data, and transmits the compressed digital signal to a neighboring base station through the communication unit 81, under the control of the CPU 71. A signal received by the communication unit 81 is subject to expansion processing and so on to be restored to its original state, subject to conversion from a digital signal to an analog signal, and a resultant analog signal is output through the speaker 77, under the control of the CPU 71.

A function whereby the Bluetooth portable terminal 2 shown in FIG. 4 gets service provision from the cash register 1 is typically implemented by an application program. In recent years, a technique of executing a JAVA virtual machine within a portable telephone and executing a JAVA application, which was previously acquired through a public network and preserved in a storage in the portable telephone, on the JAVA virtual machine has been spread. This technique can be utilized. The memory space in which the JAVA application of a portable telephone is preserved is under management different from that for an ordinary space, and it cannot be accessed from other applications. As a result, data is protected from illegal application and security is ensured.

An API that controls the Bluetooth from a JAVA virtual machine is stipulated as JSR-82. The JAVA application transmits a command to the Bluetooth module 85 through the API provided by the JAVA virtual machine. As for an event from the Bluetooth module 85, it is received through the JAVA virtual machine, or a registered function is called back.

A program operating on the Bluetooth portable terminal 2 is not necessarily limited to JAVA. Even in the case where the program operates on a platform such as the Symbian OS, Windows CE Phone Edition, Palm OS or BREW, equivalent effects are obtained.

In describing effects of the present embodiment, it is supposed that an application to get service is previously preserved in the Bluetooth portable terminal 2. Furthermore, it is supposed that a secret shared key to get service provision is preserved in EEPROM together with the application.

Figure 5:
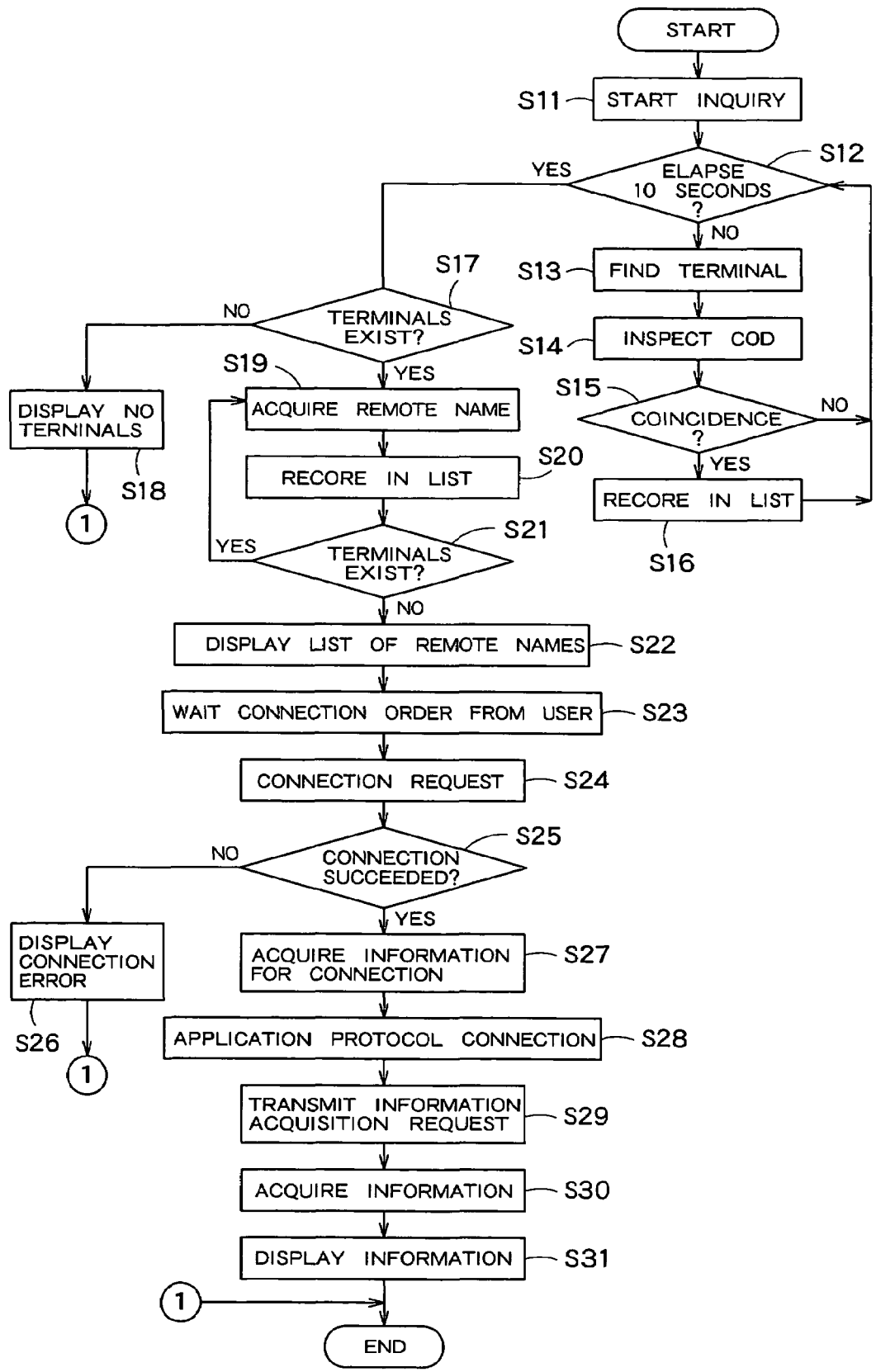
FIG. 5 is a flow chart showing a processing procedure for the Bluetooth portable terminal 2 to get service from an arbitrary opposite party in arbitrary place.

Hereafter, a procedure for the Bluetooth portable terminal 2 to get service from an arbitrary opposite party in arbitrary place will be described. FIG. 5 is a flow chart showing a processing procedure for the Bluetooth portable terminal 2 to get service from an arbitrary opposite party in arbitrary place. The processing procedure shown in FIG. 5 is similar to the processing procedure in the conventional Bluetooth portable terminal 2. The Bluetooth portable terminal 2 starts inquiry (step S11), and determines whether a time of 10 seconds has elapsed (step S12). If a terminal of the opposite party of communication is found within 10 seconds (step S13), the COD of that terminal is inspected (step S14). If the COD coincides with that previously registered (step S15), the COD is recorded in a list (step S16). If the COD does not coincide with that previously registered, processing of the step S12 and subsequent steps are repeated.

If the time of 10 seconds has elapsed, it is determined whether a terminal of the opposite party of communication exists (step S17). If a terminal of the opposite party of communication does not exist, a message to the effect that there are no terminals is displayed (step S18). If the terminal exists, a remote name of that terminal is acquired (step S19) and the remote name is recorded in the list (step S20).

Subsequently, it is determined whether another terminal exists (step S21). If another terminal exists, the processing at the step S19 and subsequent steps are repeated. If another terminal does not exist, a list of remote names is displayed (step S22) and a connection order from the user is waited for (step S23).

If there is a connection request from the user (step S24), it is determined whether the connection has succeeded (step S25). If the connection has not succeeded, a connection error is displayed (step S26). If the connection has succeeded, information for connection is acquired (step S27) and application protocol connection is conducted (step S28). Subsequently, an information acquisition request is transmitted to the terminal of communication destination (which is, in the present embodiment, the cash register 1) (step S29). Upon acquiring information from the cash register 1 (step S30), the acquired information is displayed (step S31).

The present embodiment has a feature that the transmission power of the cash register 1 is not changed by an order given from another apparatus that is conducting ACL connection, but changed by an order given from the Bluetooth module 11 and the CPU 22 connected to the internal bus 21.

The Bluetooth module 11 in the cash register 1 receives a command to change the transmission power from the host (cash register 1) as an expansion of the HCI command, and in addition transmits an event that indicates that the transmission power has been changed. Packet structures and code assignments of the HCI command and the HCI event are described in detail in the part H in the Bluetooth core specifications.

As for the HCI command for transmission power control, a dedicated code is assigned to an op code in the HCI command packet and used. As for the assignment of the dedicated code, a method of adding an instruction to an existing group, a method of defining a new group, a method of using a group for vendor debug, and so on can be considered. The argument in the power control command is managed in the baseband unit 33 so as to set the minimum value of the transmission power in the RF unit 32 to be used equal to 1 and set the maximum value equal to 100. Furthermore, the power change event can be implemented by adding it to conventional events as a new event. As the argument of the event, a value indicating a power value after change is set. Or a method of adding a code indicating the power change to the argument of a command end event in the same way as other commands may also be used. In the present embodiment, the functions heretofore described are implemented by a program.

FIG. 6 is a diagram showing the Bluetooth module 11 and a communication area. As shown in FIG. 6, the antenna 31 connected to the Bluetooth module 11 is a directional antenna 31 having a high transmission and reception sensitivity in a specific direction. In FIG. 6, Lmax is a distance over which communication can be conducted with maximum transmission power. The transmission power in the case where this distance is obtained is 1 mW classified into class 3, and the communication distance of the Bluetooth module 11 is approximately 10 m. Lmin is a communication distance with minimum transmission power. Supposing that the difference between the maximum power and the minimum power is 30 dB, the communication distance with minimum transmission power becomes approximately one thirtieth and the distance over which communication can be conducted becomes approximately 30 cm.

The difference of 30 dB between the maximum power and the minimum power is an example, and it may be another value. For example, in the case where the difference is less than 30 dB, for example, in the case where the difference is 20 dB, the minimum distance becomes 1 m. In the case where the interval from an adjacent apparatus is small as in the cash register (POS) 1, it is necessary to make the minimum distance further small. In such a case, the minimum communication distance can be set equal to approximately 30 cm by inserting an attenuator having a gain of −10 dB between the RF unit 32 and the antenna 31 in the Bluetooth module 11. As a result, however, the maximum distance also becomes 3 m. In the above described example, however, the communication distance as long as 3 m is not necessary, and the desired object can be achieved without affecting the effects of the invention. In the case where the difference between the maximum power and the minimum power is as great as 40 dB, the transmission power should be set equal to −30 dB in order to implement the desired distance.

In the case where the difference between the maximum power and the minimum power is 30 dB, the argument "1" of the power control command indicates the minimum power of −30 dB and the argument "100" indicates the maximum power. In the case where the difference is 40 dB, the argument "1" indicates −40 dB, and "25" indicating −30 dB should be set in order to obtain the desired effects.

It is supposed that the directional antenna 31 has a difference of 6 dB between an axis having a directivity and another axis. If the directivity direction of the antenna 31 is set perpendicular to a counter 86 on which the cash register 1 is placed as shown in FIG. 7, the communication distance in the horizontal direction becomes half of the communication distance in the vertical direction. Supposing that the minimum power is −30 dB, the communication distance is 60 cm in the vertical direction and 30 cm in the horizontal direction.

Figure 8:
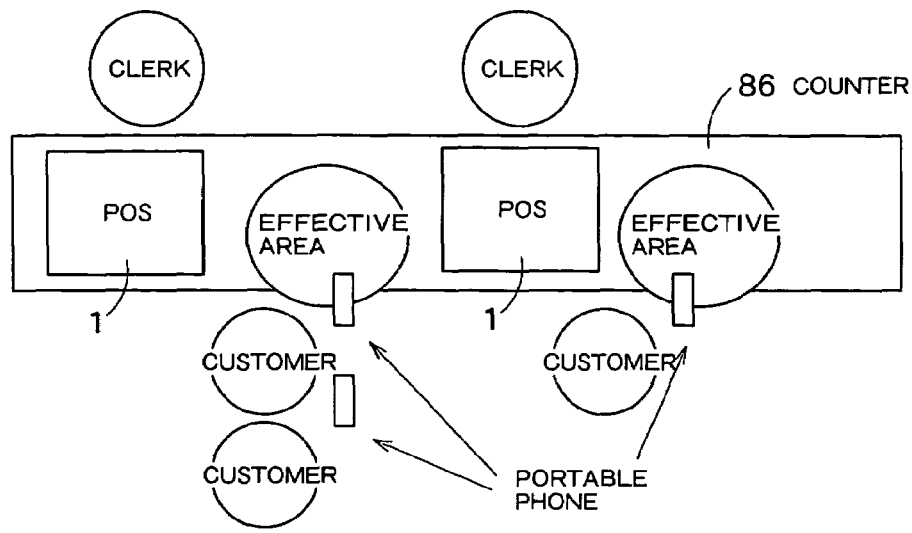
FIG. 8 is a diagram obtained by viewing FIG. 7 from right above.

FIG. 8 is a diagram obtained by viewing FIG. 7 from right above. It is supposed that the interval between adjacent cash registers (POSs) 1 installed on the counter 86 is approximately 1 m and the interval between customers standing before and behind who are about to conduct settlement at a cash register 1 is approximately 60 cm.

The Bluetooth conducts communication while hopping frequencies of 79 channels. As a matter of fact, therefore, the communication distance is not fixed because of the dispersion in transmitter performance among channels in use, the difference in antenna performance between frequencies, dispersion among individual Bluetooth modules 11 and influence of temperature characteristics. In the actual use, therefore, it is necessary to control the communication area so as to prevent it from overlapping a communication area of an adjacent apparatus.

By the way, the communication distance of 30 cm is nothing but an example. According to the situation, the value is narrowed down to approximately 10 cm (−40 dB) or 5 cm (−46 dB).

The numerical values shown in the present embodiment are nothing but examples, and other numerical values can also be used. A feature of the present embodiment is that connection with a desired opposite party is implemented by conducting control of the transmission power before the ACL connection.

Figure 9:
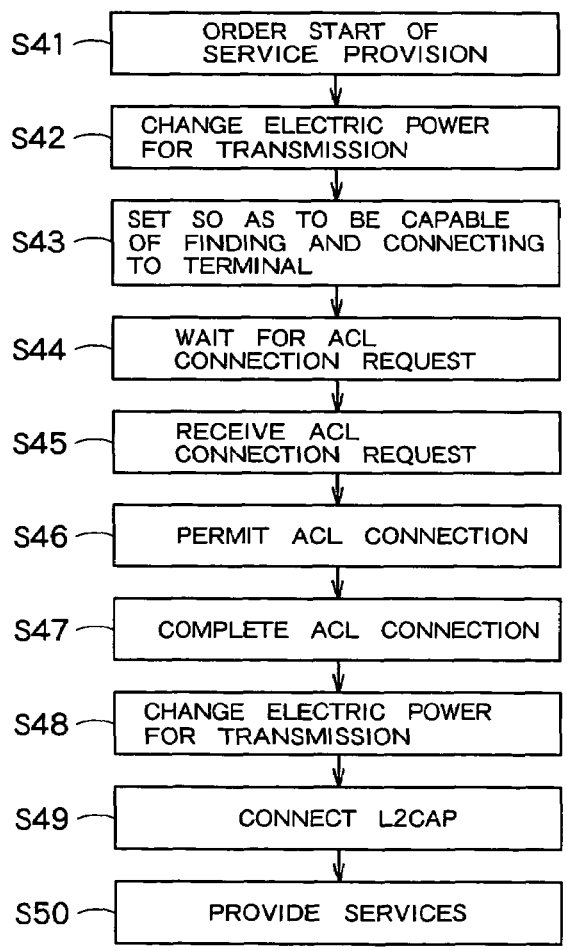
FIG. 9 is a flow chart showing an example of a processing procedure in the cash register 1.

Processing operation in the cash register 1 will now be described. FIG. 9 is a flow chart showing an example of a processing procedure in the cash register 1. First, upon being ordered to start of service provision by a program operating on the cash register 1 (step S41), the transmission power is changed (step S42) and the cash register 1 is set so as to be capable of finding a Bluetooth portable terminal 2 and being connected thereto (step S43).

Subsequently, an ACL connection request is waited for (step S44). Upon receiving an ACL connection request (step S45), the ACL connection is permitted (step S46) and the ACL connection is completed (step S47). Subsequently, the transmission power is changed (step S48), and connection processing of the L2CAP and so on is conducted (step S49). Subsequently, service provision is started (step S50).

Figure 10:
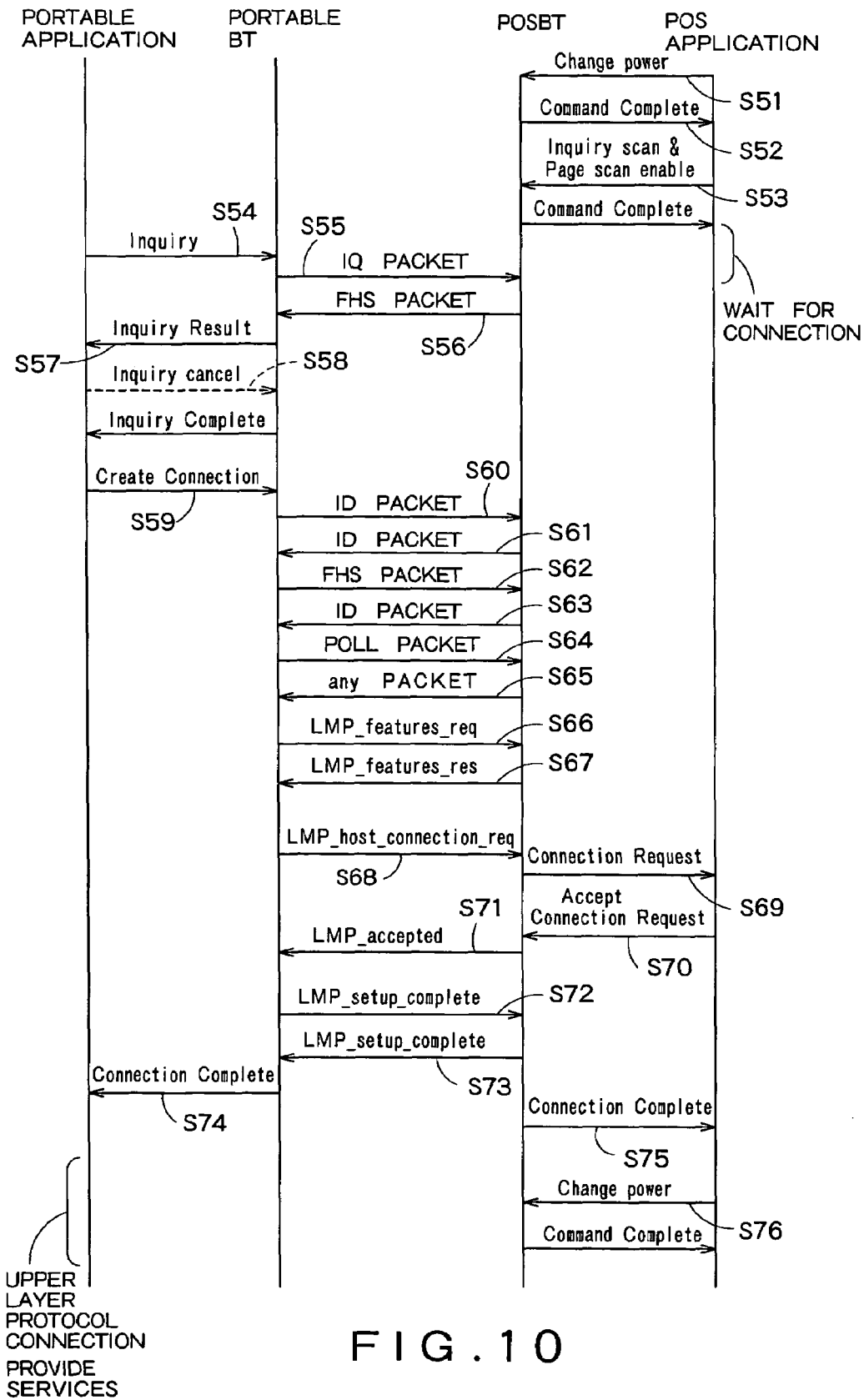
FIG. 10 is a sequence diagram showing an example of a processing procedure in a short-range wireless communication system in the case where the transmission power of the cash register 1 is controlled.

FIG. 10 is a sequence diagram showing an example of a processing procedure in a short-range wireless communication system in the case where the transmission power of the cash register (POS terminal) 1 is controlled. In FIG. 10, an initialization procedure of the cash register 1 self that provides service is omitted. Supposing that the application to provide the service has already been executed by the initialization procedure, only a procedure to actually provide the service will now be described.

If the POS operator orders the POS application to start communication using the Bluetooth, the application transmits a power change command to the Bluetooth module 11 via the HCI interface (step S51). As the argument of the power change command, "0" which is a value indicating −30 dB is set. Upon receiving the power control command, the Bluetooth module 11 responds to the command and controls the gain of the transmission unit 34 in the RF unit 32 so as to achieve the minimum power. By making the transmission power small, the communication distance in the horizontal direction becomes approximately 30 cm. Upon completion of the power change command, Bluetooth module 11 sends a command completion event to the cash register 1 (step S52).

Subsequently, the application orders the Bluetooth module 11 to set the cash register 1 so as to be capable of being found and connected, by using a Write_Scan_enable command (step S53). As a result, it becomes possible for the Bluetooth portable terminal 2 existing in the vicinity to find the cash register 1 and be connected thereto.

A user having the Bluetooth portable terminal 2 starts a dedicated JAVA application and orders service start. The JAVA application sends an inquiry command to the Bluetooth module 85 to start inquiry (step S54).

If the Bluetooth portable terminal 2 of the user exists outside the communication possible range of the cash register 1, the cash register 1 receives an IQ packet from the Bluetooth portable 2 (step S55) and returns an FHS packet (step S56). Since the Bluetooth portable terminal 2 is located outside the communication possible range of the cash register 1, however, the Bluetooth portable terminal 2 cannot receive the FHS packet, and consequently the Bluetooth portable terminal 2 cannot find the cash register 1.

On the other hand, if the Bluetooth portable terminal 2 of the user exists in the communication possible range, the Bluetooth portable terminal 2 can receive the FHS packet from the cash register 1 and recognize the cash register 1 as an apparatus with which the Bluetooth portable terminal 2 can communicate. Upon receiving an Inquiry Result event, which is a new terminal finding event (step S57), the JAVA application inspects an COD, which indicates the apparatus kind, to determine whether the COD is a desired COD. If the Inquiry Result event has a desired COD, the JAVA application cancels inquiry processing by using an Inquiry_Cancel command (step S58), and sends a Create_Connection command, which is an ACL connection request, to the found apparatus (step S59).

Subsequently, an ACL connection procedure is executed between the Bluetooth module 85 in the Bluetooth portable terminal 2 and the Bluetooth module 11 in the cash register 1. Specifically, first, the baseband unit 33 in the Bluetooth module 85 in the master (Bluetooth portable terminal 2) creates an ID packet including a DAC (Device Access code) on the basis of an address of the slave (the cash register 1), presumes a frequency with which the slave is conducting page scan on the basis of acquired Bluetooth clock information of the slave, and periodically transmits ID packets from the RF unit 32 to 16 channels located before and behind the presumed frequency (step S60). Upon receiving an ID packet including a DAC (Device Access Code), which indicates the own apparatus, the baseband unit 33 in the slave transmits the same ID packet to the master (step S61).

Upon receiving the ID packet, the baseband unit 33 in the master (the Bluetooth portable terminal 2) transmits an FHS packet including the clock information of the master to the slave (the cash register 1) (step S62). Upon receiving the FHS packet from the master, the slave transmits an ID packet (step S63) and changes the frequency hopping pattern to a hopping pattern calculated from the clock of the master.

Upon receiving the ID packet from the slave, the baseband unit 33 in the master transmits a POLL packet (step S64). Upon receiving any packet (step S65), the baseband unit 33 exchanges hardware information between both devices by using an LMP_features_req message and an LMP_features_res message (steps S66 and S67). Subsequently, the baseband unit 33 transmits an LMP_host_connection_req packet to the slave (step S68).

Upon receiving the LMP_host_connection_req packet, the baseband unit 33 in the slave sends a connection request event to the application in the cash register 1 as an HCI event (step S69). If the application sends an Accept Connection Request HCI command to the baseband unit 33 (step S70), the baseband unit 33 returns an LMP_accepted packet to the Bluetooth module 85 in the master (step S71).

If setting concerning the communication is completed, the Bluetooth portable terminal 2 and the cash register 1 send LMP_setup_complete packets to each other (steps S72 and S73).

If setting in both the baseband units 33 in the Bluetooth portable terminal 2 and the cash register 1 is completed, each of the Bluetooth modules 11 and 85 sends a Connection Complete event indicating connection completion to the application (steps S74 and S75).

Upon receiving the Connection Complete event, the POS application sends a power change command to the Bluetooth module 11 and orders the Bluetooth module 11 to increase the transmission power (step S76). For example, if the transmission power is maximized, the communication distance becomes approximately 10 m. If the communication area is made unnecessarily large, however, there is also a possibility that communication for another cash register 1 might be affected. For example, if the POS application gives an order to increase the transmission power by 12 dB, the communication distance becomes approximately 1.2 m, which is four times larger, and the influence exerted on the communication of another apparatus is reduced.

In the above-described first embodiment, the cash register 1, which is the opposite party of the communication, cannot be found, unless the Bluetooth portable terminal 2 of the user is brought close to the cash register 1. Therefore, a cash register 1 other than the desired apparatus is not found. Furthermore, after the connection of the ACL, it becomes unnecessary to bring the Bluetooth portable terminal 2 close to the cash register 1 by making the transmission power of the cash register 1 large. In the communication range of the Bluetooth, the Bluetooth portable terminal 2 can be moved freely.

Once the ACL link is connected, therefore, subsequent processing can be conducted continuously also in the case where the user has put the Bluetooth portable terminal 2 in a pocket or a bag.

In the present embodiment, the user is restrained in posture only between the issuance of the connection order for the application in the Bluetooth portable terminal 2 and the establishment of the ACL link. If high speed connection specifications for the Bluetooth, which is now being drawn up, is used, the time required for the terminal finding processing and the ACL connection processing becomes several hundreds milliseconds. As compared with the infrared ray communication or the service providing apparatus with an attenuator simply inserted, therefore, it is not necessary for the user to maintain the same posture for a long time, resulting in convenience for use.

As heretofore described, it is possible in the first embodiment to easily and reliably conduct communication with the cash register 1 in a short time without being restrained in posture for a long time, so long as the user of the Bluetooth portable terminal 2 starts the application dedicated to desired service and orders the communication start near the cash register 1, which is the opposite party of the communication. In the present embodiment, equivalent effects can be obtained also in the case where the user starts the application and issues a connection request and then bring the Bluetooth portable terminal 2 close to a desired apparatus, or also in the case where the user brings the Bluetooth portable terminal 2 close to a desired apparatus and then issues a connection request.

If it becomes possible to provide the user with service, the POS application in the cash register 1 transmits a transmission power decrease command to the Bluetooth module 11, and then receives a power change completion event from the Bluetooth module 11. Upon receiving this event, the POS application can notify the user that the communication is possible by lighting a lamp 12, such as a LED, attached to the cash register 1. Since the user can recognize that the connection is possible when the lamp 12 is lit, the user can know accurately the timing when the user's Bluetooth portable terminal 2 should be brought close to the cash register 1.

After the AC link connection has been completed, the POS application transmits the transmission power increase command to the Bluetooth module 11, and then receives the power change completion event from the Bluetooth module 11. Upon receiving this event, the POS application outputs announcement such as "CONNECTED" through the speaker, lights the lamp 12 connected to the cash register 1, or outputs a message such as "CONNECTED" to a display device directed to the user. By this output, the user can know that the user's Bluetooth portable terminal 2 could be connected to the cash register 1 and the timing when the Bluetooth portable terminal 2 can be got away from the cash register 1, resulting in convenience for the user.

Conventionally, so that the user can easily discriminate a desired apparatus among the found apparatuses, the processing of transmitting Remote_name_request to the found apparatus, acquiring a name for identification, and exhibiting the name to the user is necessary. In the present embodiment, however, the apparatus with which communication can be conducted is the desired one apparatus, and consequently the selection processing conducted by the user is not needed. Therefore, the identification name acquisition processing using Remote_name_request becomes unnecessary, and the processing time can be shortened as compared with the conventional technique.

Second Embodiment

In the first embodiment, the Bluetooth module 11 in the cash register of the slave side, which provides service, conducts control on transmission and reception. In the second embodiment hereafter described, the Bluetooth portable terminal of the master side, which gets service, conducts control on the transmission power. Hereafter, different points from the first embodiment will be mainly described.

In the second embodiment, the Bluetooth module 85 in the Bluetooth portable terminal 2 changes the transmission power by using a command to order a transmission power change described in a program, which operates on the Bluetooth portable terminal 2.

Figure 11:
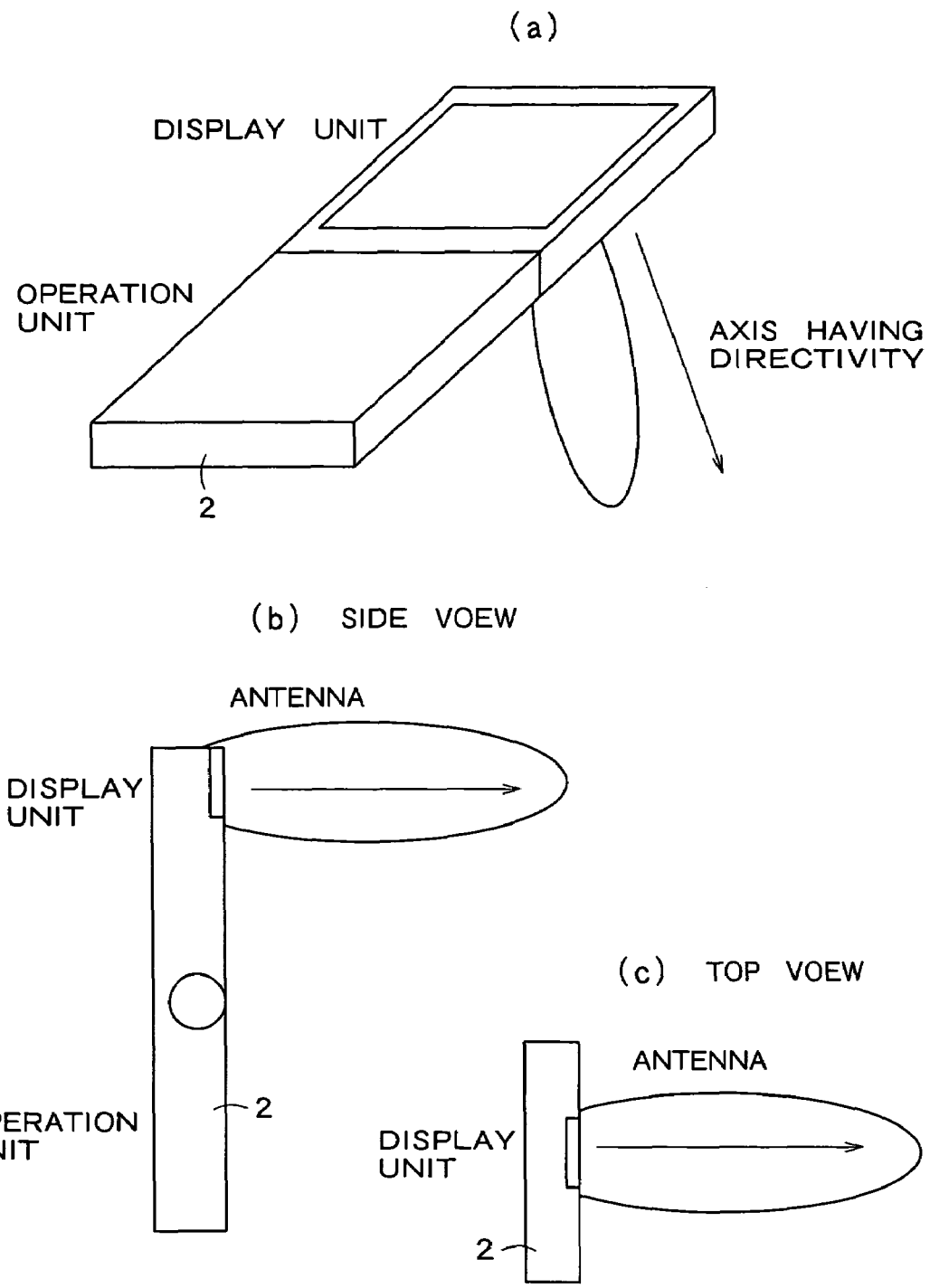
FIG. 11 is a diagram showing a position relation between the Bluetooth portable terminal 2 and the antenna 31.

FIG. 11 is a diagram showing a position relation between the Bluetooth portable terminal 2 and the antenna 31. FIG. 11(a) is an perspective view, and FIG. 11(b) is a side view. FIG. 11(c) is a top view. Supposing that the difference between the directional direction axis and the nondirectional axis of the directional antenna 31 is 6 dB and the directional direction is set perpendicular to the back panel of the Bluetooth portable terminal 2, the communication distance in the horizontal direction becomes half of the communication distance in the vertical direction. Supposing that the minimum power is −30 dB, the communication distance becomes 60 cm in the vertical direction and 30 cm in the horizontal direction.

Typically, the user of the Bluetooth portable terminal 2 operates the Bluetooth portable terminal 2 while watching a screen on the Bluetooth portable terminal 2. In the case where the antenna 31 is attached to the counter 86 of the cash register (POS) 1, therefore, the Bluetooth portable terminal 2 is placed above the antenna 31. As a result, communication can be conducted while adjusting the sensitivity of the directional antenna 31.

In the case where the antenna 31 is attached to the side face of the cash register 1, stable communication becomes possible by only bringing the rear face of the portable telephone close to the side face of the cash register 1.

Figure 12:
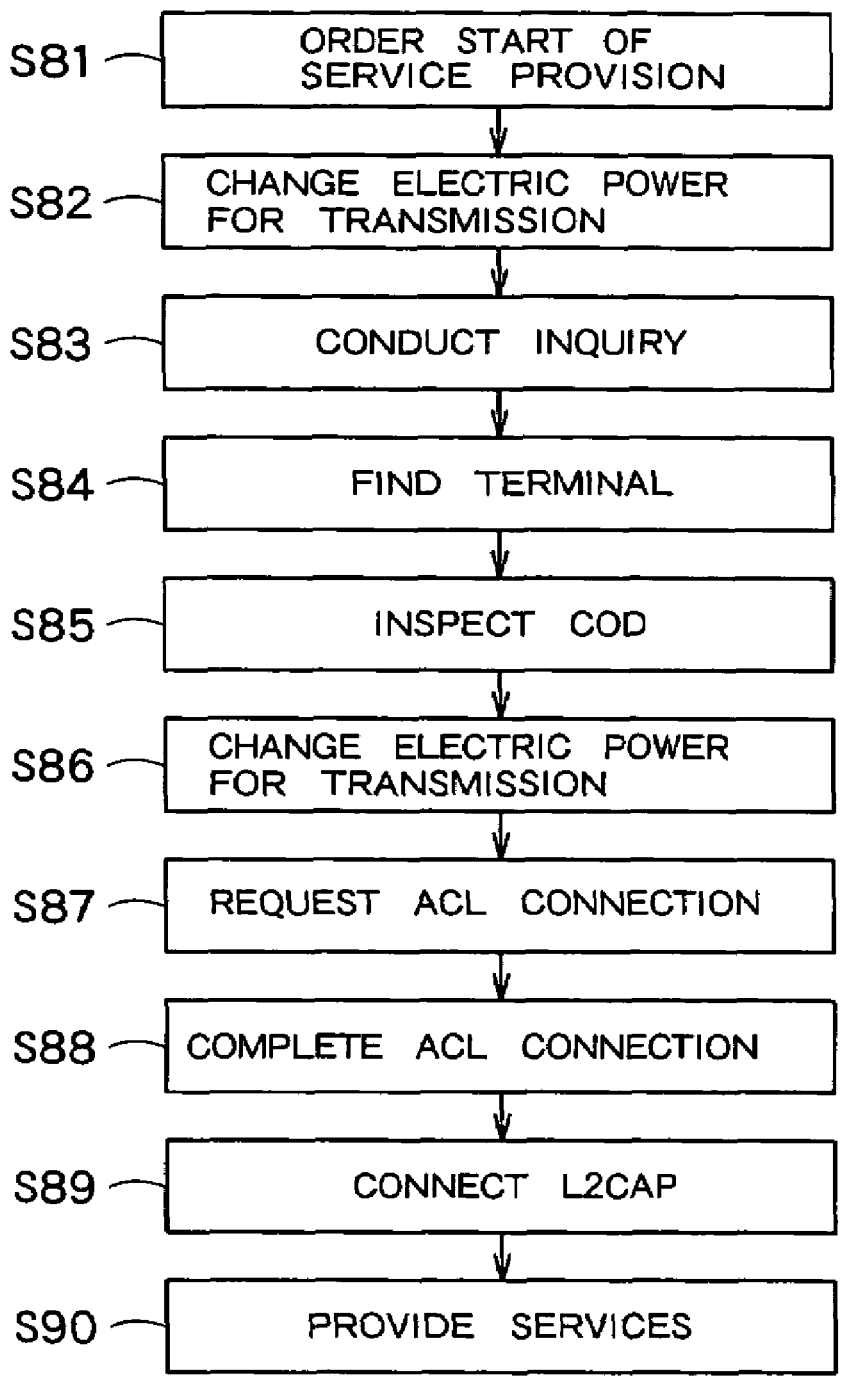
FIG. 12 is a flow chart showing an example of a processing procedure in the second embodiment of the Bluetooth portable terminal 2.

FIG. 12 is a flow chart showing an example of a processing procedure in the second embodiment of the Bluetooth portable terminal 2. First, it is supposed that the Bluetooth module 11 in the cash register 1 is in a state in which the Bluetooth module 11 can be found and can conduct communication. A user having the Bluetooth portable terminal 2 starts a dedicated JAVA application and orders service start (step S81). Subsequently, the transmission power of the Bluetooth portable terminal 2 is changed (step S82). Subsequently, the Bluetooth portable terminal 2 executes inquiry (step S83). If an apparatus is found (step S84), the Bluetooth portable terminal 2 inspects an COD and changes the transmission power (step S86).

Subsequently, the Bluetooth portable terminal 2 issues an ACL connection request (step S87). Upon completion of the ACL connection (step S88), the Bluetooth portable terminal 2 conducts L2CAP connection (step S89) and gets service provision from the cash register 1 (step S90).

Figure 13:
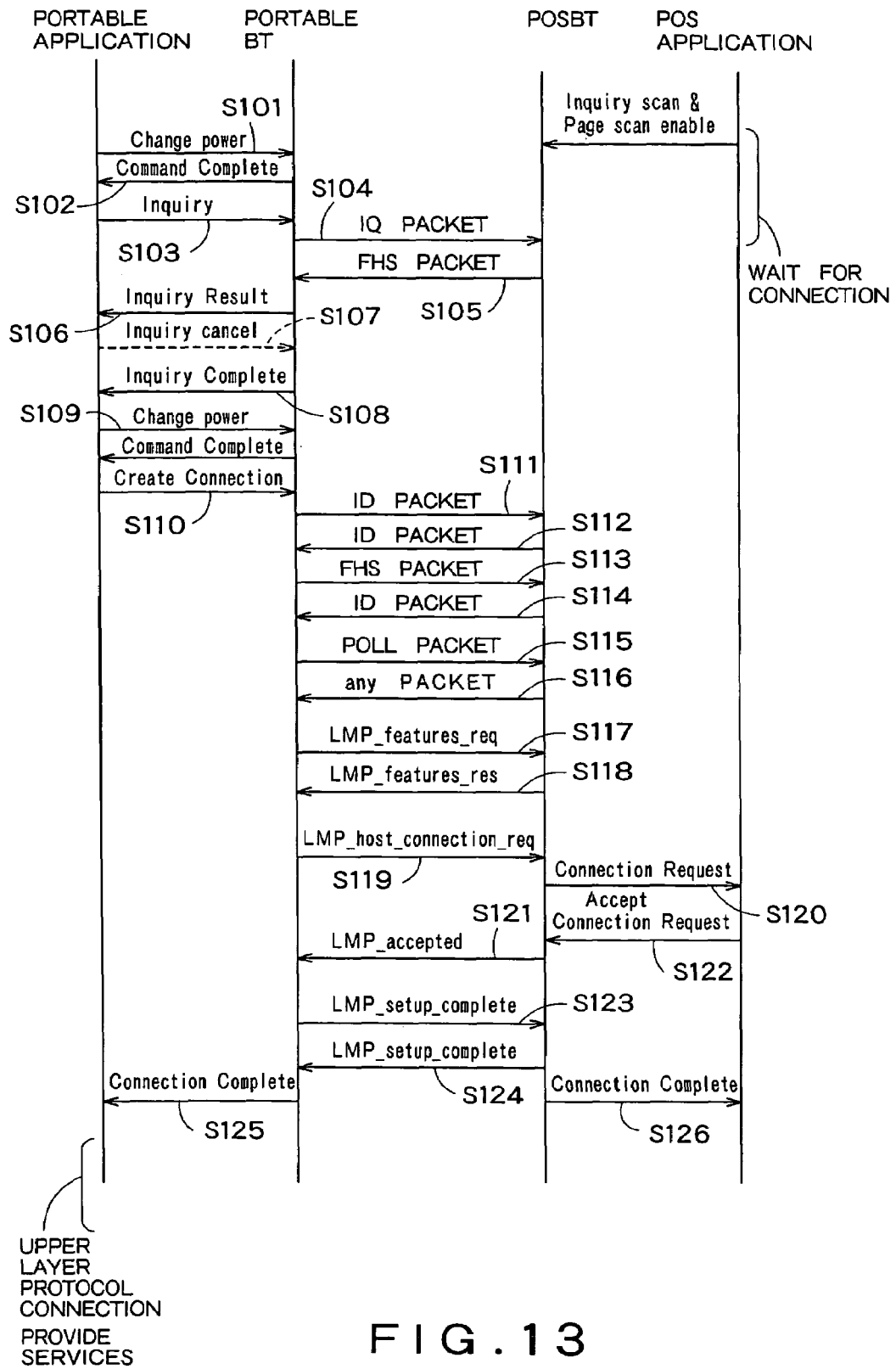
FIG. 13 is a sequence diagram showing a processing procedure in a second embodiment of a short-range communication system according to the present invention.

FIG. 13 is a sequence diagram showing a processing procedure in a second embodiment of a short-range communication system according to the present invention. JAVA application started by the Bluetooth portable terminal 2 sends a command to change the transmission power, to the Bluetooth module 85 via an API in a JAVA virtual machine (step S101). After the transmission power in the RF unit 32 has been changed, the baseband unit 33 sends an event (step S102). Upon receiving a command completion event, the JAVA application sends an inquiry command to start inquiry (step S103).

If the Bluetooth module 11 in the cash register 1 exists outside the communication possible range of the Bluetooth module in the Bluetooth portable terminal 2, the cash register 1 cannot receives an IQ packet from the Bluetooth portable terminal 2. If the cash register 1 exists in the communication possible range of the Bluetooth portable terminal 2 of the user, the baseband unit 33 receives an IQ packet (step S104) and the baseband unit 33 in the cash register 1 returns an FHS packet (step S105).

The baseband unit 33 in the Bluetooth portable terminal 2 can receive an FHS packet and recognizes the cash register 1 as an apparatus that can communicate with the Bluetooth portable terminal 2.

Upon receiving an Inquiry Result event, which is a new terminal finding event (step S106), the JAVA virtual machine in the Bluetooth portable terminal 2 transmits a terminal finding message to the JAVA application. The JAVA application inspects an COD, which indicates the apparatus kind, to determine whether the COD is a desired COD. If a desired COD is included, the JAVA application requests the Bluetooth module 85 via the virtual machine to cancel the inquiry by using a Inquiry_Cancel command (step S107). As a result of the execution of the cancel command, the JAVA application receives an Inquiry Complete event (step S108). Upon receiving this event, the JAVA application sends a power change command to the Bluetooth module 85 to change the transmission power in the RF unit 32 (step S109).

After the power has been change, the baseband unit 33 in the Bluetooth portable terminal 2 sends a Create_Connection command, which is an ACL connection request, by using a Bluetooth address of the found apparatus as an argument (step S110). As a result, effects equivalent to those of the first embodiment are obtained.

Even if the transmission power is changed after the Connection Complete event, which indicates the completion of the ACL connection, has been received, instead of when the Inquiry Complete event has been received, equivalent effects are obtained.

In an alternate configuration, the virtual machine, which activates the JAVA application, does not send the power change command to the Bluetooth module 85. In the case where a predetermined command, such as inquiry or the connection request, has been received from the JAVA application, or in the case where a predetermined event, such as the Inquiry Result event or the Connection Complete event, has been received, the application that implements the JAVA virtual machine sends the power change command to the Bluetooth module 85, in place of the JAVA application.

In steps S111 to S126 shown in FIG. 13, processing similar to the steps S60 to S76 is conducted. Therefore, detailed description thereof will be omitted.

Besides the application to get service, the Bluetooth portable terminal 2 often executes other Bluetooth applications. In the case where power control has been conducted, therefore, there is a possibility that connection cannot be conducted successfully when another application is used, unless processing is returned to default setting. In the case where an apparatus that can conduct communication cannot be found after the inquiry for a fixed time, i.e., in the case where an apparatus that can conduct communication cannot be found until the Inquiry Complete event is received, therefore, the transmission power change command is issued so as to return the transmission power to the original value. Or in the case where the JAVA application is finished in the middle of the inquiry, the destructor in the JAVA application is described so as to return the transmission power to the original value, or the virtual machine conducts processing on its own responsibility.

As a reliable method, the current transmission power is acquired and its value is recorded at the time of initialization of the JAVA application, and the setting is returned to the original value in the destructor of the JAVA application. In such a case, not only the transmission power change command, but also a command to read the current transmission power from the Bluetooth module 85 is prepared. The program developer may not be conscious of such work, by executing such work when the JAVA virtual machine starts the application and when the JAVA virtual machine terminates the application.

By using the method as heretofore described, such a phenomenon that other Bluetooth applications cannot be connected because of a change in transmission power is prevented from occurring.

In the case where the return value in the order of the power change command has succeeded, the Bluetooth portable terminal 2 outputs a predetermined signal. For example, in the case where the transmission power has been lowered, the LED is lit in red. If the transmission power is returned to the original value, the LED is lit in blue. As a result, the user can easily recognize when the Bluetooth portable terminal 2 should be brought close to the cash register 1 and when the Bluetooth portable terminal 2 can be got away from the cash register 1. Furthermore, the output is not limited to the LED. Even if the output is voice, music, a message on the screen, similar effects can be obtained. In the case of the portable terminal, equivalent effects can be obtained also in the case where the output is vibration.

In the present embodiment, the directional antenna 31 is used so as to facilitate connection to the apparatus located at a short distance of several cm. In the case where connection to an apparatus, such as an access point, installed on the ceiling is conducted, it is more convenient to use a nondirectional antenna 31. Therefore, it is also possible to provide both the directional antenna 31 and the nondirectional antenna 31 in the Bluetooth portable terminal 2 and switch the antennas 31 according to the transmission power. As for the switching method, an automatic switching method in which the directional antenna 31 is used when the transmission power is low and the nondirectional antenna 31 is used when the transmission power is high, or a method in which a dedicated HCI event command and event are provided and the application issues an order is conceivable.

Thus, in the second embodiment, the Bluetooth portable terminal 2 conducts transmission power switching control. When issuing inquiry to the cash register 1, the transmission power is reduced. After the completion of the inquiry, the transmission power is increased. Therefore, the Bluetooth portable terminal 2 can be connected to a desired cash register reliably. Once the inquiry has been completed, the Bluetooth portable terminal 2 can get service from the cash register 1 also in the case where the Bluetooth portable terminal 2 is kept away from the cash register. Convenience in use is improved for the user of the Bluetooth portable terminal 2.

Third Embodiment

In the first embodiment, the configuration in which the power control command is explicitly given from the upper layer application as the HCI command has been described. On the other hand, in the third embodiment described hereafter, the transmission power is automatically changed to a predetermined value by the link management function in the Bluetooth module 11, when an execution order of a specific command is received from the CPU. There is a feature in that a Bluetooth module 11 having an automatic power control function is provided.

Figure 14:
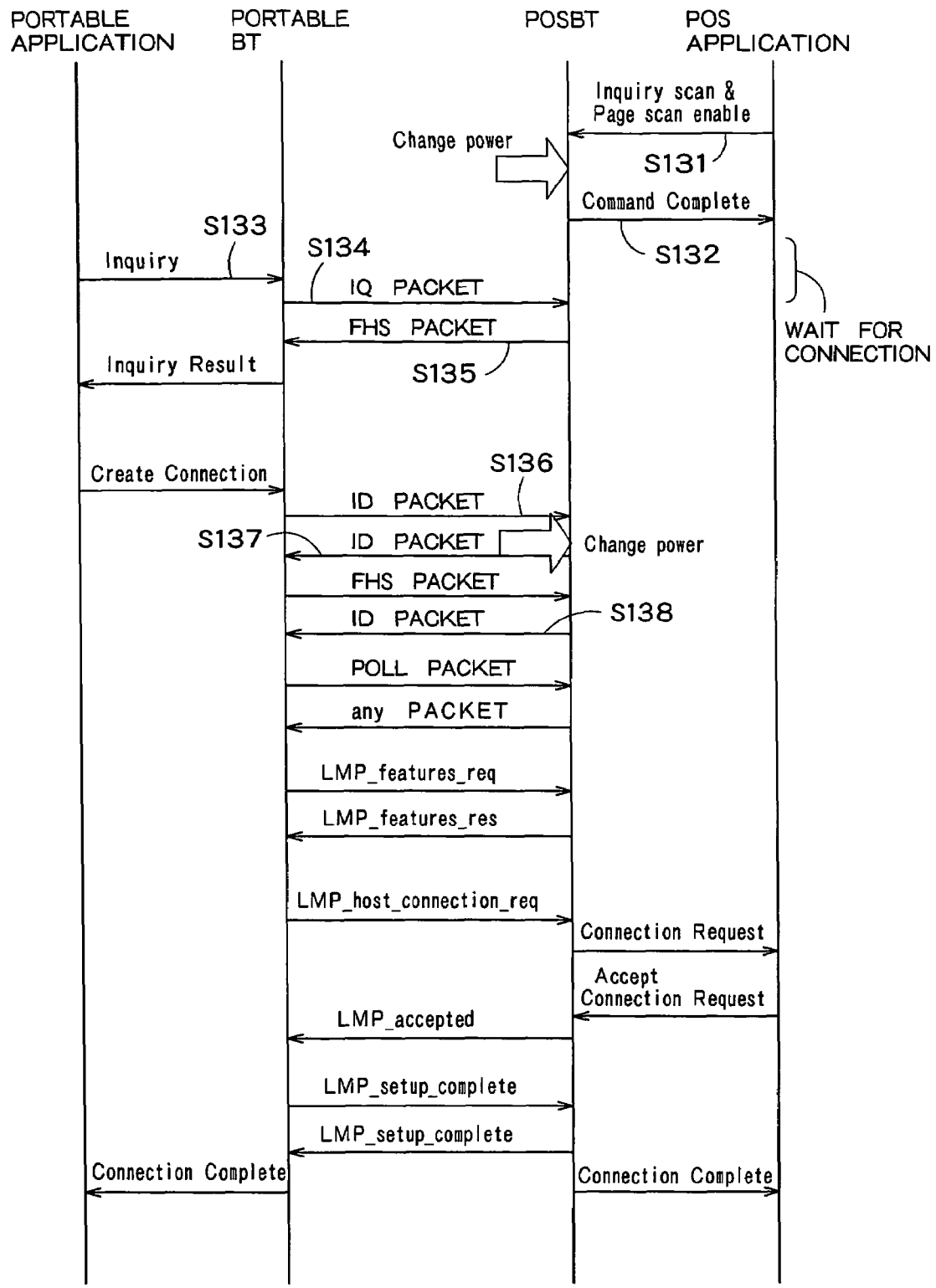
FIG. 14 is a sequence diagram showing a processing procedure in the third embodiment of a short-range communication system according to the present invention.

FIG. 14 is a sequence diagram showing a processing procedure in the third embodiment of a short-range communication system according to the present invention. Hereafter, the sequence diagram will be described laying stress on points different from FIG. 10. As described above, the link management function is implemented as a program executed in the CPU mounted in the Bluetooth module 11. Or in the case where the RF unit 32 is connected directly to the CPU, the link management function is implemented as a program that operates on the CPU.

If the POS operator orders the application to start the communication using the Bluetooth, the POS application sends a Write_Scan_Enable command to the Bluetooth module 11 to set the cash register 1 so as to cause the cash register 1 to be capable of being found and connected (step S131). The Bluetooth module 11 interprets the HCI command. If the HCI command is Write_Scan_Enable and its argument is "capable of being found and connected", the Bluetooth module 11 orders the RF unit 32 to change the transmission power so as to set the communication distance equal to several cm (step S132). If the RF unit 32 has succeeded in transmission power change, the Bluetooth module 11 exercises control so as to periodically bring about an Inquiry Scan state and a Page Scan State, which are states in which the cash register can be found and connected.

If the Bluetooth portable terminal 2 exists in the communication possible range of the cash register 1, the Bluetooth module 11 in the cash register 1 receives an IQ packet from the Bluetooth portable terminal 2 (step S134) at the time of the inquiry scan state (step S133). Upon receiving the IQ packet, the Bluetooth module 11 transmits an FHS packet including an address of its own apparatus, COD (Class of Device), and the Bluetooth clock (step S135).

Thereafter, if the Bluetooth module 11 receives an ID packet at the time of the Page Scan state (step S136), to be correct, if an output of a correlator in the RF unit 32 in the reception state represented in the DAC (Device Access Code) has exceeded a threshold, the Bluetooth module 11 causes the state to make a transition to a Page Response sub state, and orders the RF unit 32 to change the transmission power so as to set the communication distance equal to several m (step S137). After the RF unit 32 has changed the transmission power, the Bluetooth module 11 transmits an ID packet at prescribed timing (step S138).

In the third embodiment, effects equivalent to those of the first embodiment can be obtained as heretofore described. Furthermore, in the third embodiment, the program operating in the cash register 1 has compatibility with the program operating in the ordinary Bluetooth portable terminal 2 without being conscious of power control when connected to the Bluetooth portable terminal 2. This results in an effect that few changes are needed in the conventional program in the program development.

In the above described example, the transmission power is changed when an ID packet has been received in the Page Scan state. Instead, the Bluetooth module 11 may order the RF unit 32 to change the transmission power so as to set the communication distance equal to several m when the procedure has advanced to some degree, such as when an Lmp_connection_Request packet has been received or when the connection complete state has been assumed.

After the transmission power has been changed, the RF unit 32 transmits an ID packet at prescribed timing. In some cases, however, the ID packet from the cash register 1 is not received by the Bluetooth portable terminal 2 for some reason. The sequence diagram in this case becomes as shown in FIG. 15.

After the RF unit 32 has changed the transmission power, the ID packet is transmitted at prescribed timing. If thereafter an FHS packet is not received in a predetermined time (step S142), the state makes a transition from the page response sub state to the Page Scan state. This is because the Bluetooth portable terminal 2 could not receive the ID packet from the cash register 1 for some reason. This is a problem caused because of insufficient transmission power. Unless some countermeasure is taken, a Page Timeout event occurs in the middle of the connection processing, and the user needs to order the connection procedure again. This is not favorable from the aspect of convenience.

Figure 15:
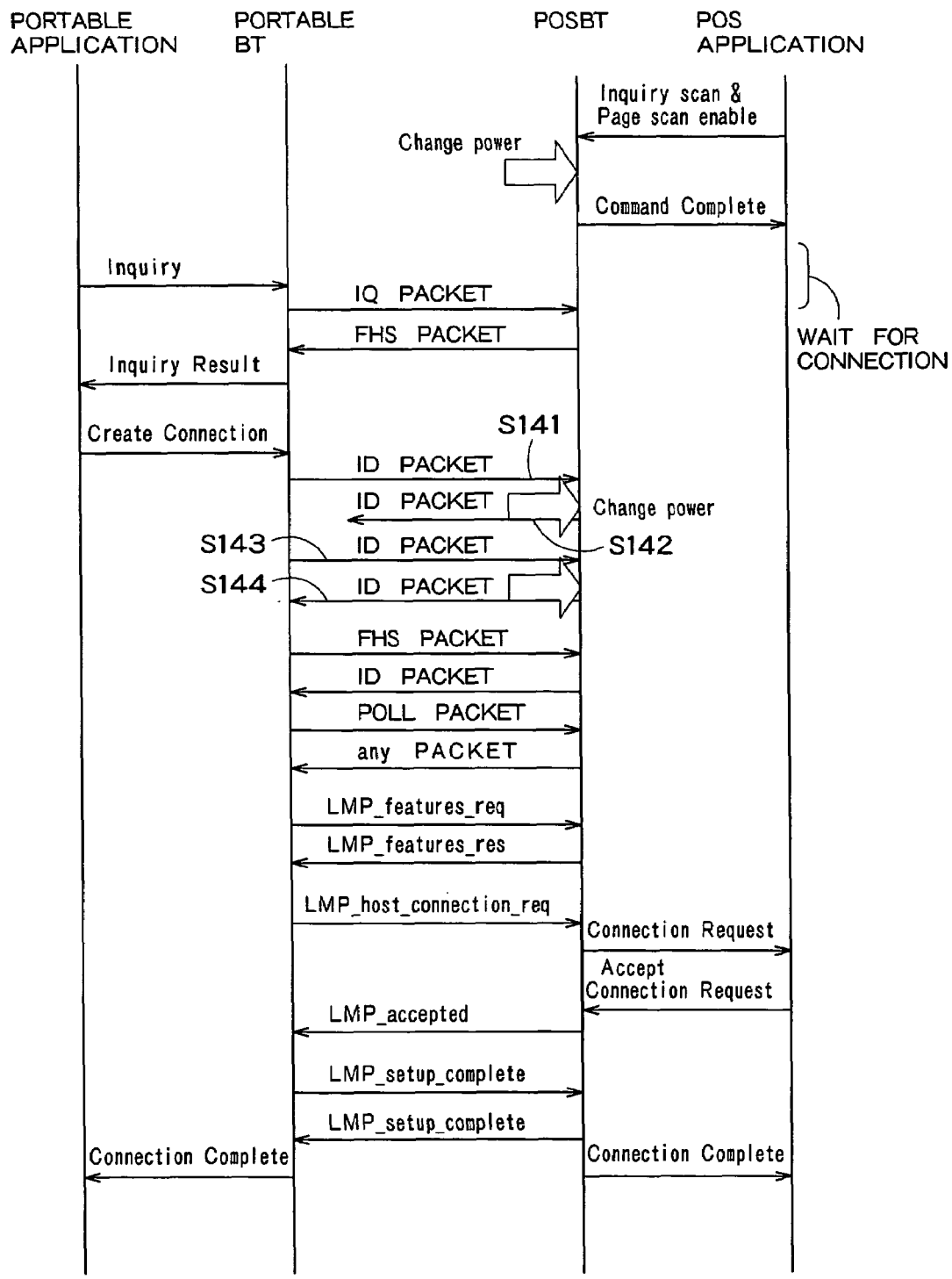
FIG. 15 is a sequence diagram showing a modified example of FIG. 14.

In FIG. 15, therefore, if the connection processing does not advance in the middle of connection processing with reduced transmission power, i.e., the situation described above has been sensed, the RF unit 32 is ordered to change the transmission power so as to exceed the value set the last time by, for example, 3 dB (where the communication distance becomes 1.4 times larger) (step S143). After the RF unit 32 has changed the transmission power, an ID packet is transmitted at prescribed timing (step S144).

Even if the connection processing does not advance successfully because of insufficient transmission power, the transmission power is increased and the connection processing is advanced owing to the method heretofore described. As a result, it becomes possible to automatically conduct connection processing without the need for the user to give an order again.

Thus, in the third embodiment, upon receiving an execution order of a specific command in the program in the cash register 1, the transmission power of the cash register 1 is decreased. Thereafter, upon receiving an ID packet from the Bluetooth portable terminal 2, the transmission power is increased. In the same way as the first embodiment, therefore, desired service can be provided for the desired Bluetooth portable terminal 2.

Fourth Embodiment

In the second embodiment, the configuration in which the power control command is explicitly given as the HCI command by the high-rank application has been described. On the other hand, in a fourth embodiment described hereafter, upon receiving an execution order of a specific command from the program in the Bluetooth portable terminal 2, the transmission power is automatically changed to a predetermined value by the link management function in the Bluetooth module 85. There is a feature that the Bluetooth module 85 having an automatic power control function is provided. Hereafter, the fourth embodiment will be described while laying stress on portions different from those in the second embodiment.

Figure 16:
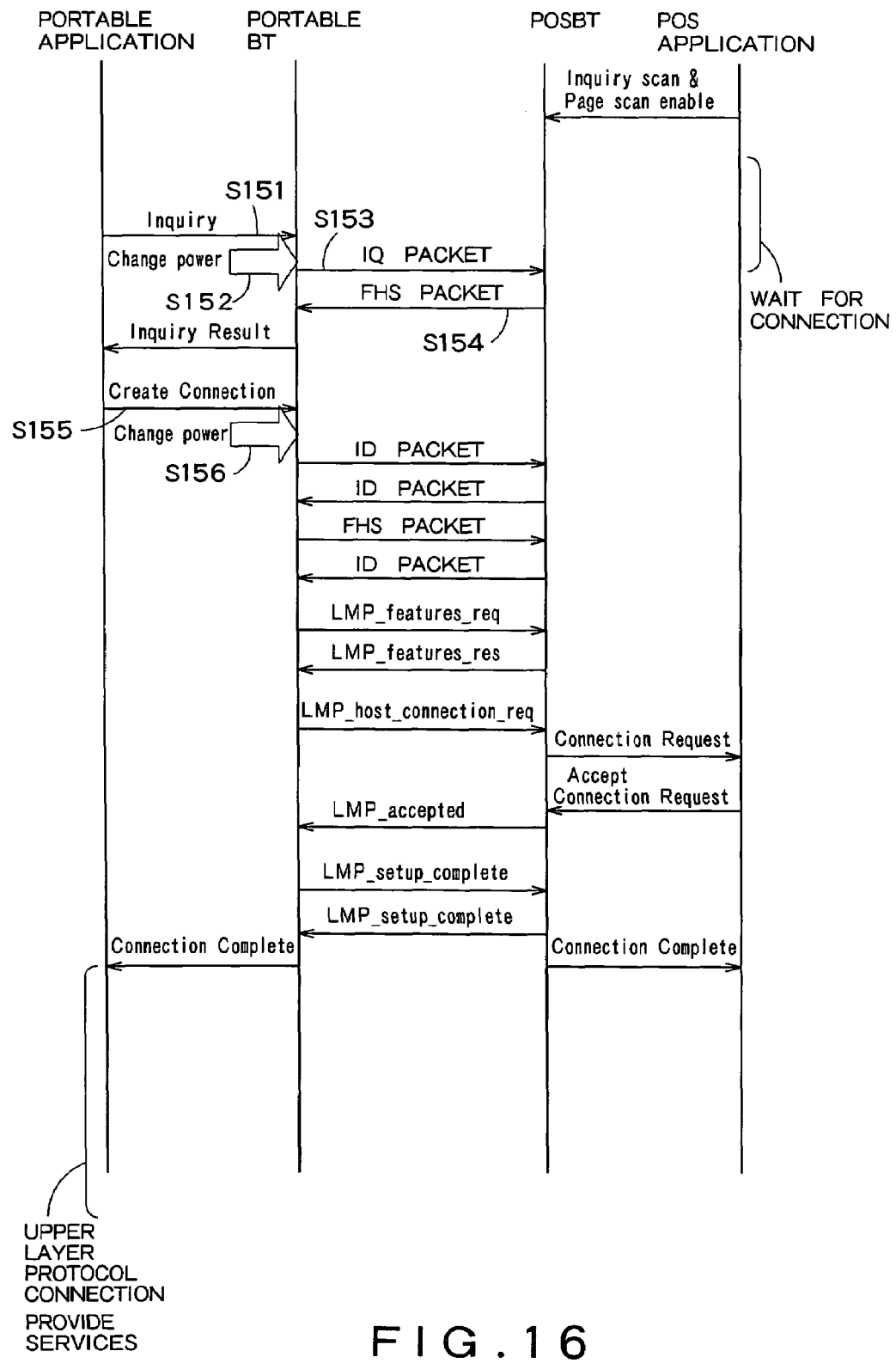
FIG. 16 is a flow chart showing a processing procedure of a fourth embodiment of a short-range communication system according to the present invention.

FIG. 16 is a flow chart showing a processing procedure of a fourth embodiment of a short-range communication system according to the present invention. If an owner of the Bluetooth portable terminal 2 orders the application to start communication using the Bluetooth, an inquiry command is transmitted to the Bluetooth module 85 in the Bluetooth portable terminal 2 to find an apparatus with which communication can be conducted (step S151).

The Bluetooth module 85 interprets the HCI command. If the HCI command is inquiry, the RF unit 32 is ordered to change the transmission power so as to set the communication distance equal to several cm (step S152). If the RF unit 32 has succeeded in change of the transmission power, a transition to the inquiry state is made and an IQ packet is transmitted for a predetermined time (step S153). Upon receiving an FHS packet during that time (step S154), the Bluetooth portable terminal 2 is notified of information including the Bluetooth address, COD and clock. Upon receiving that information, the JAVA application inspects the COD. If the apparatus is the pertinent apparatus, an Inquiry Cancel command is transmitted to the Bluetooth module 85. Upon receiving an Inquiry Complete event, a Create_Connection command with the Bluetooth address of the found apparatus as an argument is transmitted to the Bluetooth module 85 (step S155).

The Bluetooth module 85 interprets the HCI command. If the HCI command is Create_Connection, the RF unit 32 is ordered to change the transmission power so as to set the communication distance equal to several m (step S156). After the RF unit 32 has changed the transmission power, the Bluetooth module 85 makes a transition to the page state and conducts connection processing.

Thus, in the fourth embodiment, upon receiving the execution order of the specific command from the program in the Bluetooth portable terminal 2, the transmission power is automatically controlled by the link management function in the Bluetooth module 85. Therefore, it becomes possible to exercise control to reduce the transmission power during the inquiry interval and increase the transmission power after the inquiry interval has finished. As a result, effects equivalent to those in the second embodiment can be obtained.

Furthermore, in the fourth embodiment, the program of the JAVA application has compatibility with the program operating in the ordinary Bluetooth when connected to the Bluetooth without being conscious of power control. In the development of the program in the JAVA application, therefore, the program developer need not change the conventional program.

By using the configuration described heretofore in the first to the fourth embodiments, it becomes possible to connect to a desired apparatus reliably in a time of several seconds by only simple operation of bringing the Bluetooth portable terminal 2 close to the Bluetooth module 11 in the cash register 1 for only several hundreds ms conducted by the owner of the Bluetooth portable terminal 2.

Furthermore, in the first to fourth embodiments, an example in which the Bluetooth portable terminal 2, which gets service, plays a role of the master and the cash register 1, which provides the service, plays a role of the slave has been described. Even if the Bluetooth portable terminal 2 plays a role of the slave and the cash register 1 plays a role of the master, however, equivalent effects are obtained. Such a situation can be implemented by master-slave exchange. In this case, the subject of change in transmission power is also replaced between the Bluetooth portable terminal 2 and the cash register 1.

In the first to fourth embodiments, there are effects also in the case where the Bluetooth portable terminal 2 and the cash register are used singly. Even if each of them includes a combination, it becomes possible to obtain similar effects. In that case, the communication range is very small, and consequently unnecessary radio waves are not transmitted to the surroundings. Therefore, it becomes possible to reduce the influence on communication of other apparatuses.

The first to fourth embodiments have been described supposing that the portable terminal getting service is a portable telephone. However, also in the case where the Bluetooth module 85 is attached to a portable information processing device called PDA, a digital still camera, a music reproduction device, a notebook computer, a watch incorporating an information processing device, or clothes, equivalent effects can be obtained.

Supposing that the service providing apparatus is a POS register, description has been conducted. However, also in the case where the Bluetooth module 11 is attached to an automatic vending machine, a gate in a parking lot, a facility gate, in information providing apparatus, a multimedia kiosk, a digital photolithography apparatus (DPE), and so on, equivalent effects can be obtained.

In the first to fourth embodiments, the application in the portable telephone is JAVA. However, any program can be used, so long as the program conducts equivalent processing. Even if the program operates in various OSs such as Symbian™, Palm™, ITORN™, LINUX™, Windows CE™ and BREW™, there are no problems.

Fifth Embodiment

In the first to fourth embodiments, information transmission between the cash register 1 and the Bluetooth portable terminal 2 has been described. However, the present invention can also be applied to information transmission between Bluetooth portable terminals.

In a fifth embodiment, an example in which information transmission is conducted between Bluetooth portable terminals each including the Bluetooth module 85 will now be described. Here, a Bluetooth portable terminal that requests connection is referred to as master, and a Bluetooth portable terminal that receives the connection request is referred to as slave.

Since these Bluetooth portable terminals have a configuration similar to that shown in FIG. 4, description of the configuration will be omitted.

Figure 17:
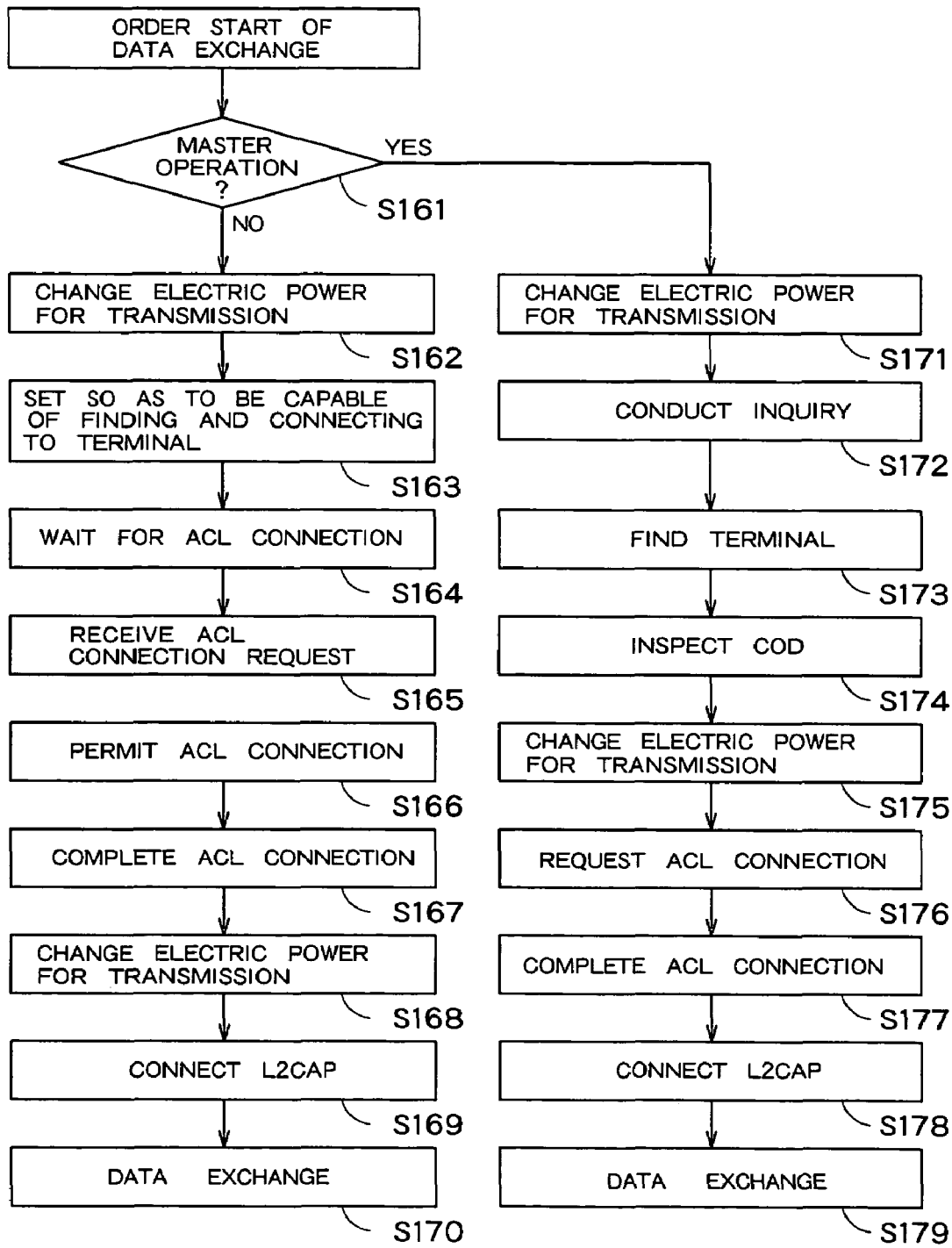
FIG. 17 is a flow chart showing an example of a processing procedure of a Bluetooth portable terminal 2 according to the fifth embodiment.

FIG. 17 is a flow chart showing an example of a processing procedure of a Bluetooth portable terminal 2 according to the fifth embodiment. First, it is determined whether the Bluetooth portable terminal 2 is the master (step S161). If it is a Bluetooth portable terminal 2 of the master side, processing similar to that shown in FIG. 9 is conducted (steps S162 to S170). If it is a Bluetooth portable terminal 2 of the slave side, processing similar to that shown in FIG. 12 is conducted (steps S171 to S179).

Figure 18:
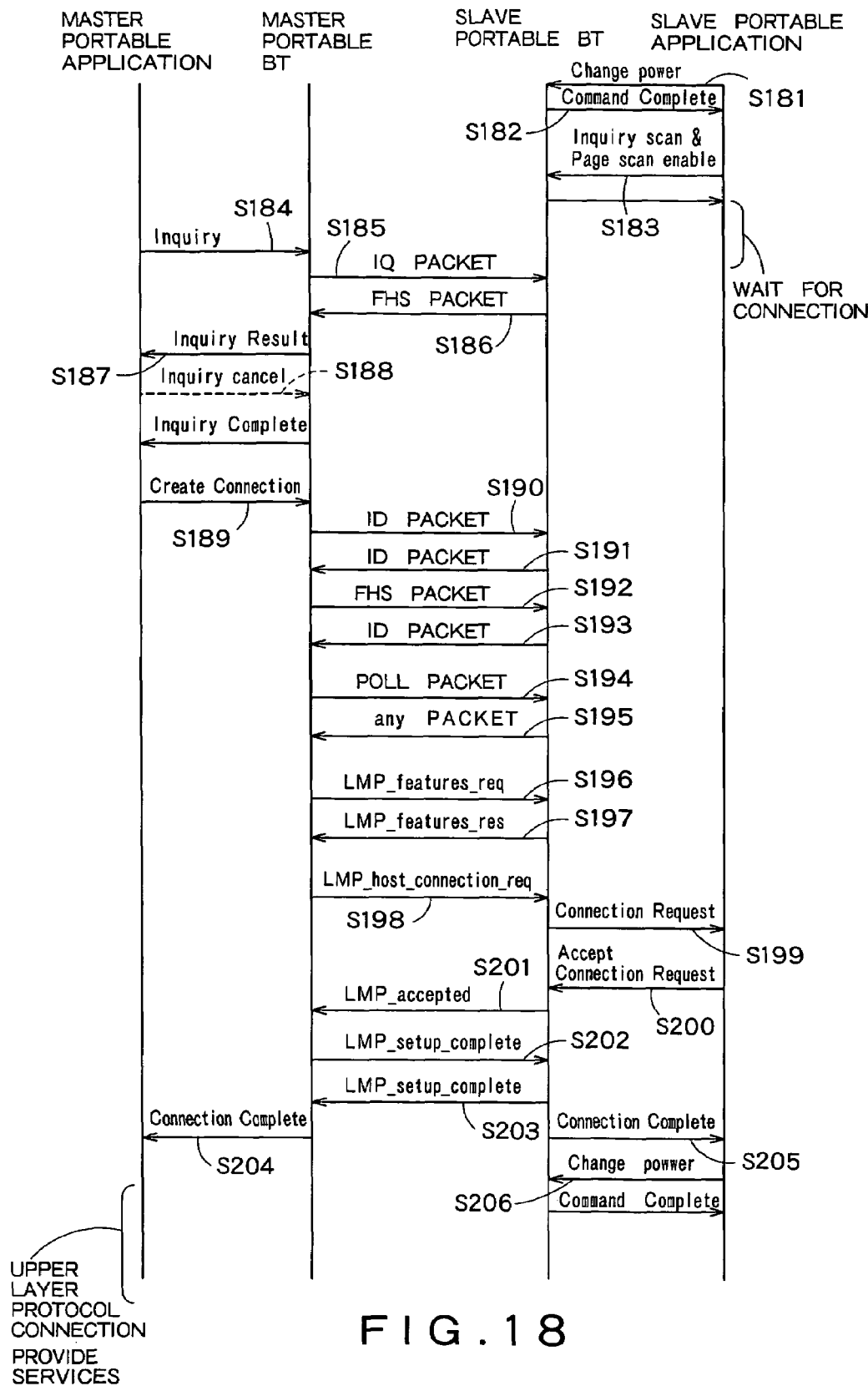
FIG. 18 is a sequence diagram showing an example of a processing procedure for the data exchange, transmission and reception conducted between the Bluetooth portable terminals 2 according to the fifth embodiment.

FIG. 18 is a sequence diagram showing an example of a processing procedure for the data exchange, transmission and reception conducted between the Bluetooth portable terminals 2 according to the fifth embodiment. This sequence diagram is basically the same as that shown in FIG. 10. The program to conduct the data exchange, transmission and reception in the Bluetooth portable terminals 2 of the slave side is implemented by an application program. The application program such as JAVA is downloaded to the Bluetooth portable terminal 2 of the slave side via a communication line. In the case where Bluetooth is used in short-range wireless communication, OBEX (Object Exchange), PAN (Personal Area Networking), or the like is used as the protocol to conduct data exchange, transmission and reception.

The present invention is not limited to the above-described embodiments. In the implementation stage, various modifications are possible without departing from the spirit thereof. In addition, inventions in various stages are incorporated in the embodiments. Various inventions can be extracted by suitably combinations in a plurality of disclosed structural elements. For example, also in the case where some structural elements are removed from all structural elements shown in the embodiments, a configuration with the structural elements removed can be extracted so long as (at least one of) the problems can be solved and (at least one of) the effects are obtained.

What is claimed is:

1. An information providing apparatus, comprising:
    a first power controller which sets electric power for transmission so that a possible range of wireless communication becomes a first range;
    a connection processing unit configured to conduct connection processing with respect to said information receiver when the possible range of wireless communication is set to said first range, and connection request from an information receiver is received;
    a second power controller which sets electric power for transmission so that the possible range of wireless communication becomes a second range broader than the first range when it is determined that the transmitted information did not reach said information receiver before the connection processing with said information receiver is completed; and
    a third power controller which sets electric power for transmission so that the possible power of wireless communication becomes a third range broader than the second range after said second power controller sets the possible range of wireless communication, when there is no response for a packet transmitted to said information receiver, and it is determined that the transmitted information has not reached said information receiver.

2. The information providing apparatus according to claim 1, wherein said information receiver is a portable terminal.

3. The information providing apparatus according to claim 1, wherein wireless communication is conducted according to Bluetooth ™.

4. An information providing apparatus, comprising:
    a first power controller which sets electric power for transmission so that a possible range of wireless communication becomes a first range;
    a connection processing unit configured to conduct connection processing with respect to said information receiver when the possible range of wireless communication is set to said first range, and connection request from an information receiver is received; and
    a second power controller which sets electric power for transmission so that the possible range of wireless communication becomes a second range broader than the first range when a predetermined first packet is received from the information receiver before the connection processing with said information receiver is completed; and
    a third power controller which sets electric power for transmission so that the possible power of wireless communication becomes a third range broader than the second range after said second power controller sets the possible range of wireless communication, when there is no response for a packet transmitted to said information receiver, and the first packet is received again from the information receiver.

5. The information providing apparatus according to claim 4, wherein said information receiver is a portable terminal.

6. The information providing apparatus according to claim 4, wherein wireless communication is conducted according to Bluetooth™.

* * * * *